United States Patent
Colgren

(10) Patent No.: US 6,273,370 B1
(45) Date of Patent: Aug. 14, 2001

(54) METHOD AND SYSTEM FOR ESTIMATION AND CORRECTION OF ANGLE-OF-ATTACK AND SIDESLIP ANGLE FROM ACCELERATION MEASUREMENTS

(75) Inventor: Richard D. Colgren, Palmdale, CA (US)

(73) Assignee: Lockheed Martin Corporation, Palmdale, CA (US)

( * ) Notice: Subject to any disclaimer, the term of this patent is extended or adjusted under 35 U.S.C. 154(b) by 0 days.

(21) Appl. No.: 09/431,948

(22) Filed: Nov. 1, 1999

(51) Int. Cl.[7] ............................. B61L 3/00; G05D 1/00; G06F 17/00
(52) U.S. Cl. .................... 244/181; 244/194; 244/195; 701/6
(58) Field of Search ................ 701/6, 220; 244/181, 244/194, 195

(56) References Cited

U.S. PATENT DOCUMENTS

| | | | |
|---|---|---|---|
| 3,814,912 | * 6/1974 | Manke et al. | 235/150.2 |
| 3,924,262 | * 12/1975 | Melancon | 340/27 |
| 3,970,829 | * 7/1976 | Melvin | 235/150.22 |
| 4,769,759 | * 9/1988 | McGough | 364/435 |
| 4,893,245 | * 1/1990 | Zweifel | 364/435 |
| 5,988,562 | * 11/1999 | Linick | 244/3.21 |

* cited by examiner

Primary Examiner—Charles T. Jordan
Assistant Examiner—Christian M. Best
(74) Attorney, Agent, or Firm—Robert A. Schruhl

(57) ABSTRACT

A method and system is disclosed for using inertial sensors in an Inertial Navigation System (INS) to obtain analytic estimates of angle-of-attack ($_\alpha$) and sideslip angle ($_\alpha$). The inertial sensors consist of one or more accelerometers which produce the estimated signals for angle-of-attack ($_\alpha$) and sideslip angle ($_\beta$). Three methods are shown for obtaining $\alpha$ and $\beta$ estimates from INS information and are programmed into a nonlinear simulation of a relaxed stability aircraft requiring a high level of artificial stability augmentation in its flight control system. Simulation results from the nonlinear simulation for each of the three methods were compared with the results obtained when conventional probes were used to obtain direct measurements of $\alpha$ and $\beta$. Based on these comparisons, a method for determining $\alpha$ and $\beta$ analytically which estimates the turbulence level in each axis is combined with one of the three methods to provide derived inertial values for providing control system feedback to an aircraft.

18 Claims, 29 Drawing Sheets

METHOD AND SYSTEM FOR ESTIMATION AND CORRECTION OF ANGLE-OF-ATTACK AND SIDESLIP ANGLE FROM ACCELERATION MEASUREMENTS

BACKGROUND OF THE INVENTION

1. Field of the Invention

The present invention generally relates to aircraft control systems, and more particularly to using accelerometers to generate angle-of-attack and sideslip angle to provide local flow corrections to probes or vanes within an angle-of-attack and stall warning system. Still more particularly, the present invention relates to a method and system for providing an ability to reconfigure an aircraft control system after a sensor failure within the angle-of-attack and stall warning system.

2. Description of the Related Art

It has long been recognized that signals representative of aircraft angle-of-attack and aircraft sideslip angle and their respective time derivatives are useful for aircraft flight control augmentation purposes. In the past, and at present, signals from angle-of-attack and sideslip aerodynamic probes and sensors cannot be utilized as part of control feedback computations because of measurement corruption inherent in measurement of local aerodynamic flow fields around the aircraft surfaces where these probes are positioned. For example, a typical angle-of-attack probe at the airfoil surface of an aircraft is, under various circumstances, subject to severe variations and rapid perturbations of the airflow. As a result, the signal from the probe is masked by interfering or noise signals. While it is possible to process the noisy signal by means of filtering techniques to extract the useful information, the magnitude of filtering required reduces bandwidth to an unacceptably low level and so increases the response time that use of the signal for control purposes is seriously affected.

Based on the foregoing, it can be appreciated that a need exists for an improved method and system wherein the use of conventional air data probes used on modem high performance aircraft can be minimized or eliminated while still providing signals representative of aircraft angle-of-attack and sideslip angle. The subject invention herein solves all of these problems in a new and unique manner that has not been part of the art previously.

SUMMARY OF THE INVENTION

A method and system is disclosed for using inertial sensors in an Inertial Navigation System (INS) to obtain analytic estimates of angle-of-attack ($_\alpha$) and sideslip angle ($_\beta$). The inertial sensors consist of one or more accelerometers which produce the estimated signals for angle-of-attack ($_\alpha$) and sideslip angle ($_\beta$). The estimated signals may be combined with conventional probes to improve the frequency content of conventional probes using a complementary filter or aKalman filter. The estimated signals are also improved in other (perpendicular) axes by generating correction curves, for example correcting the angle-of-attack ($_\alpha$) signal by removing sideslip angle ($_\beta$) effects. Three methods are shown for obtaining alpha and beta estimates from INS information and are programmed into a nonlinear simulation of a relaxed stability aircraft requiring a high level of artificial stability augmentation in its flight control system. Simulation results from the nonlinear simulation for each of the three methods were compared with the results obtained when conventional probes were used to obtain direct measurements of $_\alpha$ and $_\beta$. Based on these comparisons, a method for determining $_\alpha$ and $_\beta$ analytically which estimates the turbulence level in each axis is combined with one of the three methods to provide derived inertial values for providing control system feedback to an aircraft.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein:

DESCRIPTION OF THE PREFERRED EMBODIMENT

Figure 1:
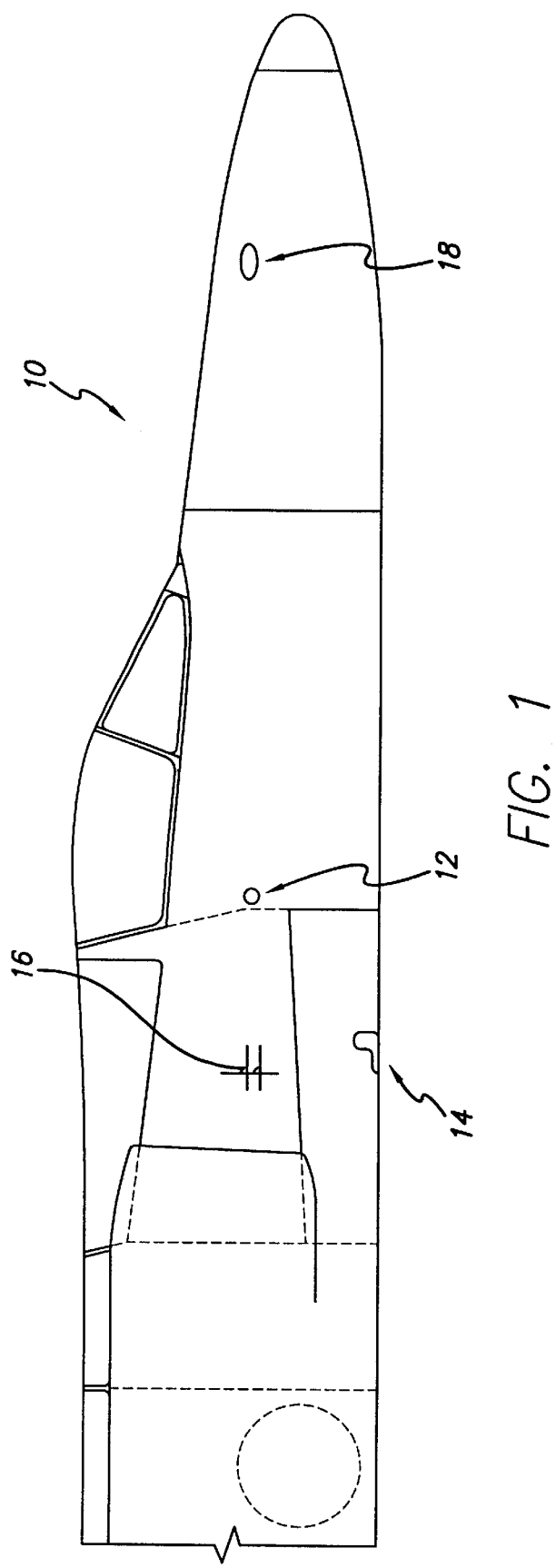
FIG. 1 is a detailed block diagram illustrating a typical aircraft having an angle-of-attack/stall warning system which may be used in accordance with a preferred embodiment of the present invention.

With reference now to the figures and in particular with reference to FIG. 1, there is depicted a detailed block diagram illustrating a typical aircraft 10 having an angle-of-attack/stall warning system which may be used in accordance with a preferred embodiment of the present invention. For a highly augmented aircraft, accurate feedbacks are essential in maintaining system stability. Referring to FIG. 1, these feedbacks are obtained by direct measurements utilizing an inertial measurement platform consisting of angle-of-attack probes 12 having processors (not shown), a sideslip centerline probe 14, air data computer static ports 16 and an accelerometer package 18. Typically, the sideslip centerline probe 14 is used in flight test only.

In accordance with a preferred embodiment of the present invention, improvements in the accuracy of inertial measurement platforms and the increasing capability and decreasing size of computers has allowed using inertial measurement platforms concurrently for deriving control system feedbacks. In another preferred embodiment of the invention, the inertial measurement platforms are used to improve the performance of angle-of-attack/stall warning systems, by estimating the sideslip angle from lateral acceleration measurements. Redundancy can also be provided, by estimating angle-of-attack from normal acceleration measurements as will be more fully described below.

However, it should be appreciated that a major difficulty exists when using an inertial measurement system in an aircraft which is its inability to directly measure instantaneous winds and turbulence. A gust will instantaneously change the velocity vector of the aircraft with respect to the air mass, but, due to the aircraft's inertia, the velocity vector relative to the inertial frame does not change instantly. Thus, the inertial platform will only sense secondary motions caused by the gust.

Figure 2:
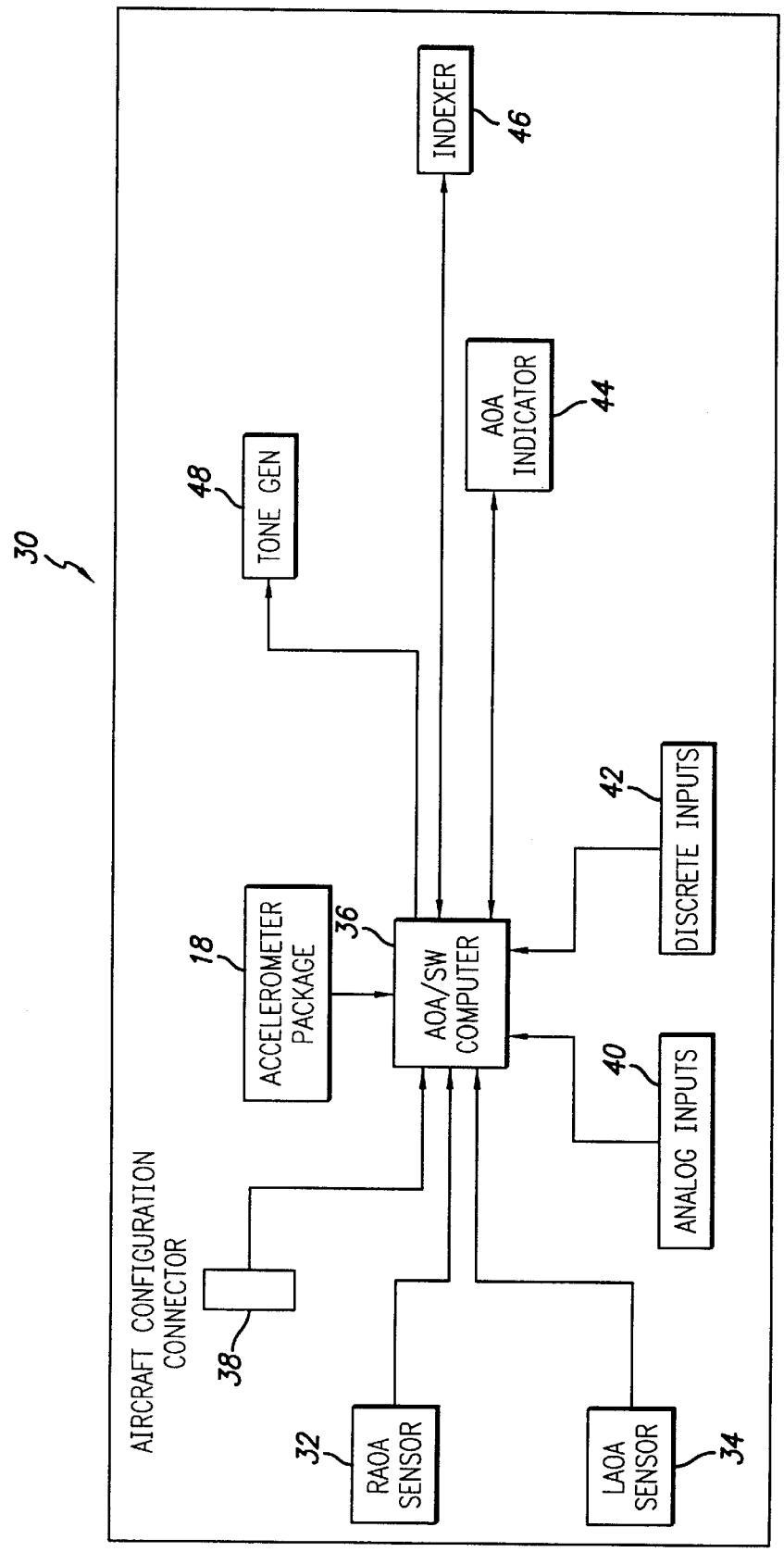
FIG. 2 is a high-level block diagram for one type of angle-of-attack/stall warning system architecture used in accordance with a preferred embodiment of the present invention.

Referring now to FIG. 2, there is shown a high-level block diagram for one type of angle-of-attack/stall warning (hereinafter referred to as AOA/SW) system 30 architecture used in accordance with a preferred embodiment of the present invention. The angle-of-attack/stall warning system 30 utilizes two (2) angle-of-attack (AOA) sensors, a right AOA sensor 32 and a left AOA sensor 34 for providing angle-of-attack data to an AOA/SW computer or data processor 36. As shown in FIG. 1, an accelerometer package 18 is installed in the aircraft 10 that provides to the AOA/SW computer 36 a lateral acceleration signal ($N_y$) and a normal acceleration signal ($N_z$). The lateral acceleration signal ($N_y$) is available to generate an estimated sideslip angle. The normal acceleration signal ($N_z$) is used to estimate the angle-of-attack. In the event of a single sensor failure, the AOA/SW computer 36 is able to receive and process a continuous normal acceleration signal ($N_z$) from a dual axis accelerometer within the accelerometer package 18. Therefore, from the acceleration inputs, the AOA/SW computer or data processor 36 is able to calculate the sideslip angle and thus the corrected angle-of-attack of the aircraft 10.

Turning once again to FIG. 2, the necessary aircraft nose/mission configuration inputs are provided to the AOA/SW computer or data processor 36 from a programmable aircraft configuration connector 38. Also, the secondary flight control surface positions, for example flaps, will be processed as a series of analog and discrete inputs 40 and 42 respectively, into the AOA/SW computer 36. The AOA/SW computer 36 then uses these inputs to calculate the correct stall curves compensated for both sideslip and aircraft configuration. The AOA/SW computer 36 provides continuous angle-of-attack indication to a cockpit indicator 44, and the necessary fast/slow airspeed information to an approach indexer 46. Additionally, the AOA/SW computer 36 provides a stall warning signal output to an AOA tone generator 48 for aural warning to the pilot.

Figure 3:
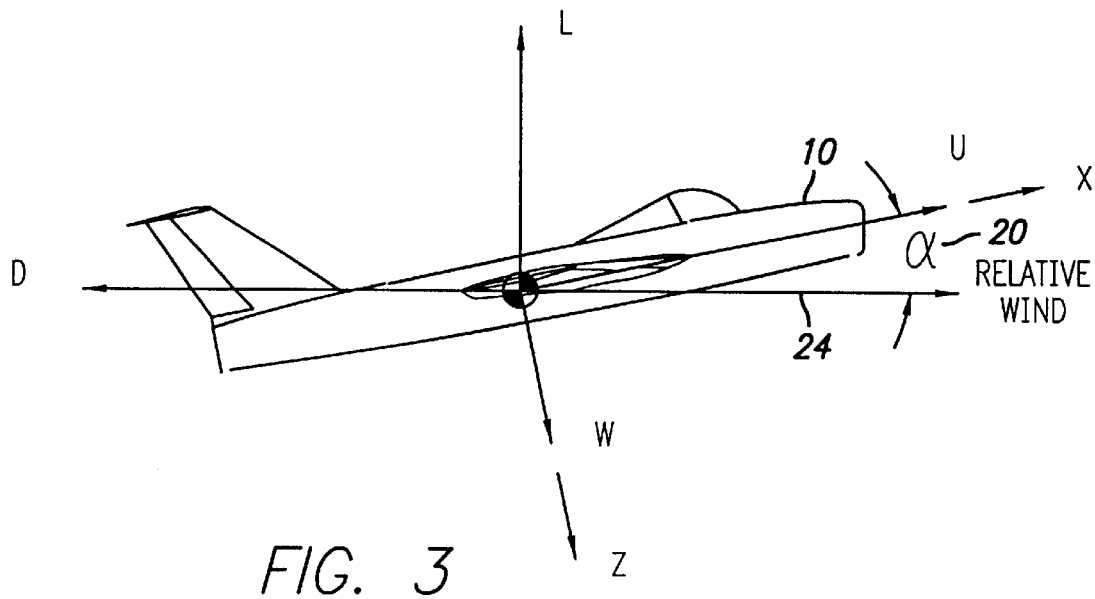
FIG. 3 illustrates a geometric diagram for the aircraft in a relative wind condition.
Figure 4:
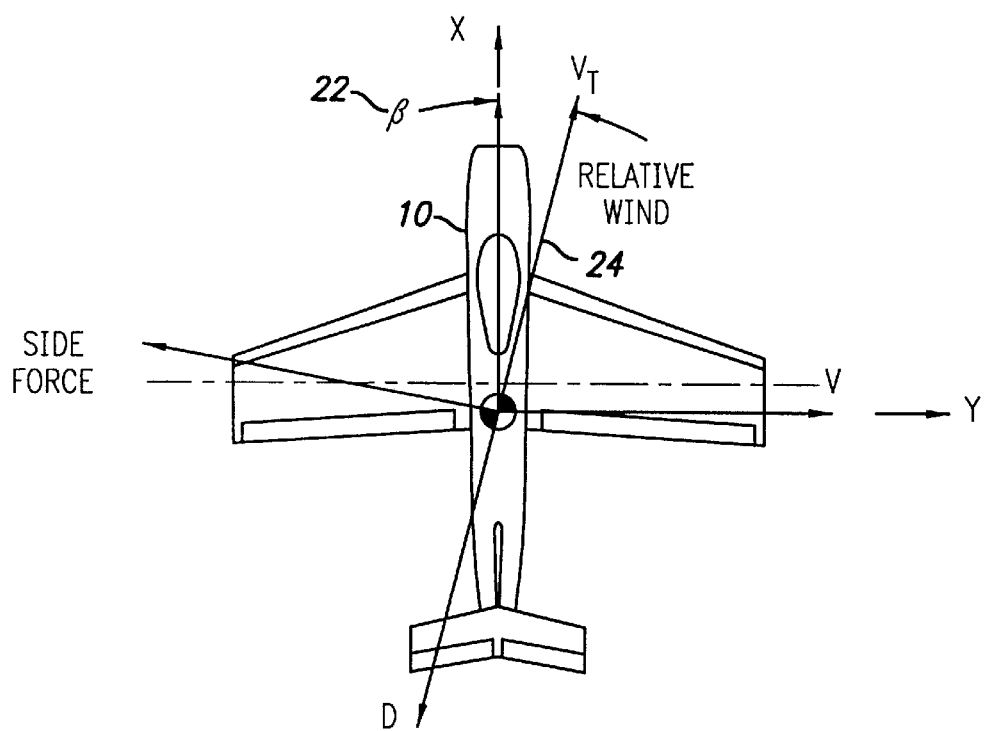
FIG. 4 illustrates another geometric diagram for the aircraft in a relative wind condition.
Figure 5:
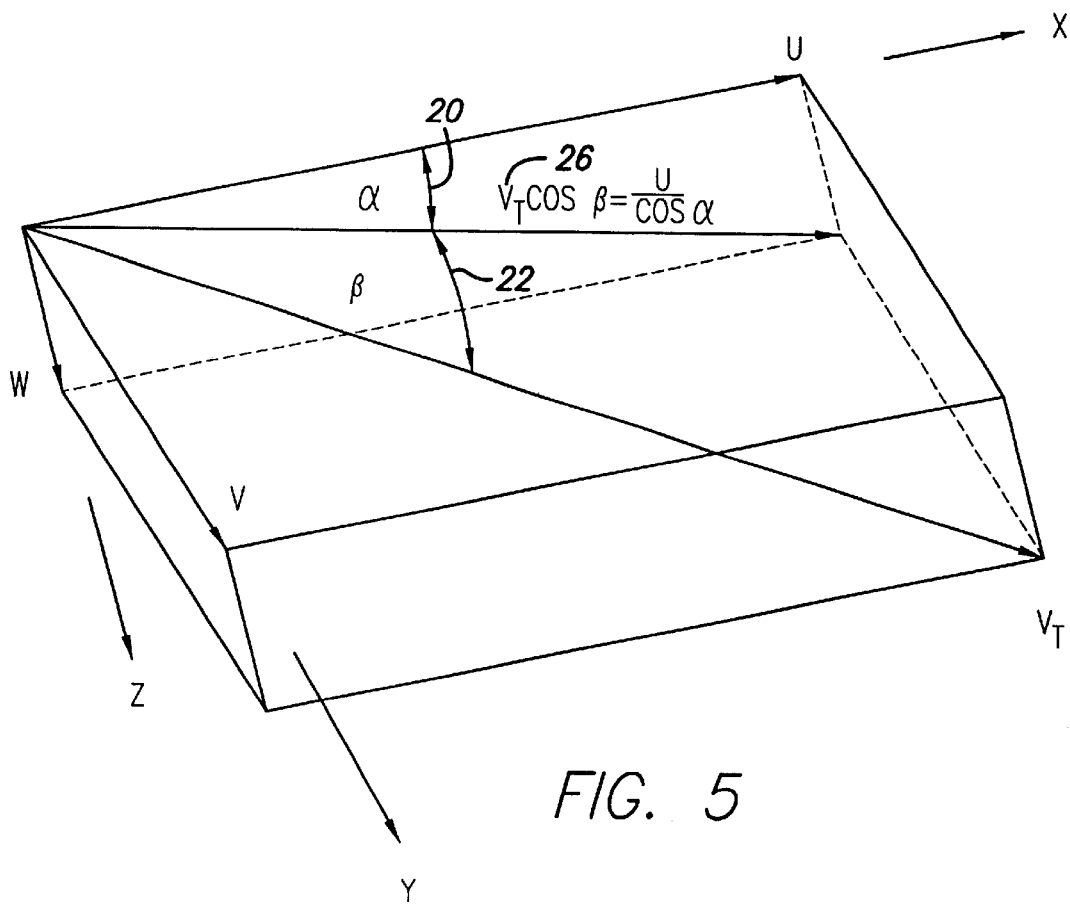
FIG. 5 is a vectorial representation for the angle-of-attack ($_\alpha$) and sideslip angle ($_\beta$) in terms of the total aircraft velocity vector.
Figure 6:
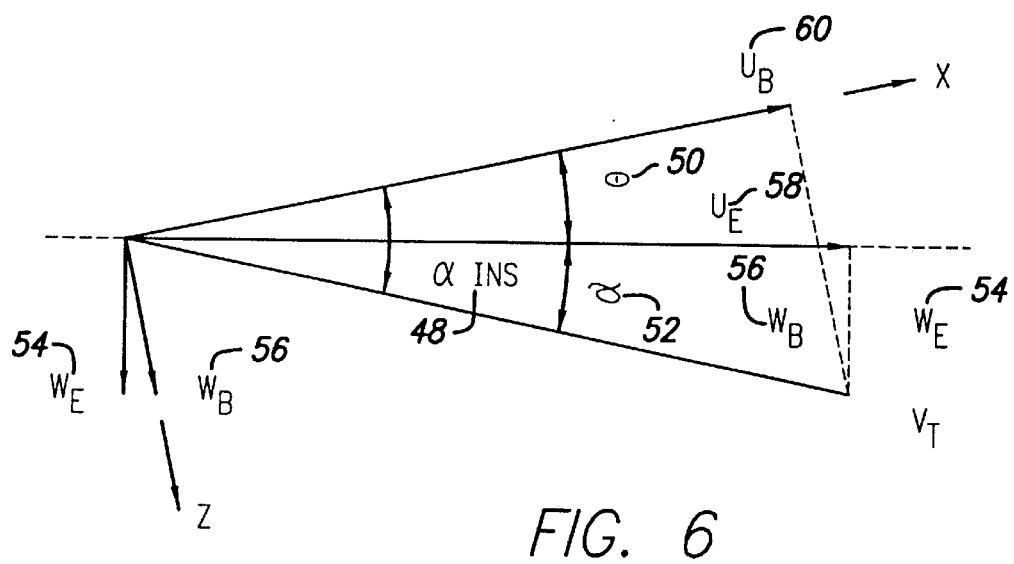
FIG. 6 is a vectorial representation of used to estimate the angle-of-attack ($_\alpha$)

The angle-of-attack ($_\alpha$) 20 and sideslip angle ($_\beta$) 22 are defined as illustrated in the geometric diagrams in FIGS. 3 and 4 for the aircraft 10 in a relative wind 24 condition. The vectorial representation for the angle-of-attack ($_\alpha$) 20 and sideslip angle ($_\beta$) 22 in terms of the total aircraft velocity vector 26 is given in FIG. 5. In accordance with the present invention, three different methods for calculating both $_\alpha$ 20 and 22 from inertial data are derived and used separately for different flight conditions. The three equations used to estimate the angle-of-attack ($_\alpha$) 20 were derived using the vectorial representation of FIG. 6. The first angle-of-attack ($_\alpha$) 20 equation is derived from the velocity components relative to an earth reference coordinate system. Referring to FIG. 6, the angle $_{\alpha ins}$ 48 can be defined in terms of the two angles θ 50 and γ 52 where θ 50 is the pitch angle (deg) and γ 52 is the flight path angle (deg). As shown in FIG. 6, γ 52 is defined in terms of $W_E$ 54 and $U_E$ 58 wherein $U_E$ 58 and $W_E$ 54 are the inertial velocity components in earth axis (ft/sec). The terms $U_B$ 58 and $W_B$ 56 are the inertial velocity components in body axis (ft/sec) wherein a downward velocity will be considered positive. Therefore, $_{\alpha ins1}$ is defined in equation 1 as:

$$\alpha_{INS1} = \theta + \tan^{-1} \frac{w_E}{u_E} \quad \text{(Equation 1)}$$

Additionally, $_\alpha$ 20 can be defined in terms of the two angles θ 50 and γ 52 giving $_{\alpha ins2}$ defined in equation 2 as:

$$\alpha_{INS2} = \theta - \gamma \quad \text{(Equation 2)}$$

Lastly, the inertial angle-of-attack can also be defined in terms of the body axis inertial velocity components $U_B$ 58 and $W_B$ 56 giving $_{\alpha ins3}$ defined in equation 3 as:

$$\alpha_{INS3} = \tan^{-1} \frac{w_B}{u_B} \quad \text{(Equation 3)}$$

Figure 7:
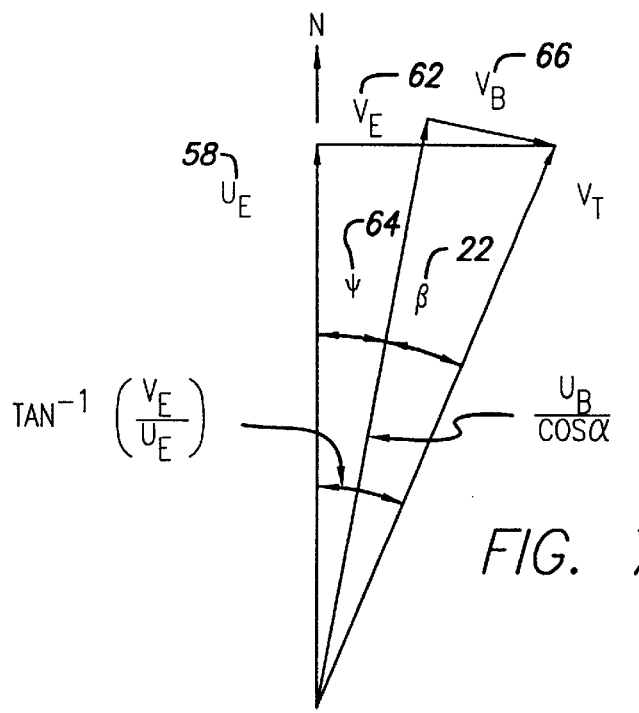
FIG. 7 is a vectorial representation of used to estimate the sideslip angle ($_\beta$)

Next, the three equations used to estimate the sideslip angle $_\beta$ 22 may similarly be derived. Referring to FIG. 7, it is seen that $_\beta$ 22 can be defined in terms of the earth reference velocities $V_E$ 62 and $U_E$ 58 and the angle ψ64 giving $_{\beta ins1}$ defined in equation 4 as:

$$\beta_{INS1} = \tan^{-1} \frac{v_E}{u_E} - \varphi \quad \text{(Equation 4)}$$

In terms of the total inertial velocity using the relationship of the inertial velocity component in body axis (ft/sec) $V_B$ 66 to the magnitude of the total inertial velocity vector in earth axis (ft/sec) $\|V\|$, gives the sideslip angle $_{\beta ins2}$ as follows in equation 5.

$$\beta_{INS2} = \sin^{-1} \frac{v_B}{\|V\|} \quad \text{(Equation 5)}$$

Projecting the total inertial velocity vector onto the body axis vertical plane as in FIG. 4, the sideslip angle $_{\beta ins3}$ can be defined in terms of the body axis inertial velocities as follows in equation 6:

$$\beta_{INS3} = \tan^{-1} \frac{v_B \cdot \cos(\alpha_{INS3})}{u_B} \quad \text{(Equation 6)}$$

All of these definitions give the perfect value for angle-of-attack ($_\alpha$) 20 and sideslip angle ($_\beta$) 22 for the wings level case with no winds, or when trimmed in a constant wind. It should be noted however, the definition of $_{\beta INS1}$ in Equation 4 in terms of the earth axis velocities makes this calculation sensitive to non-zero values for the roll angle.

Referring now to FIGS. 8 through 18, a complete six degree-of-freedom nonlinear simulation was programmed of a relaxed stability aircraft including a simulation of a full authority, command augmentation flight control system and used to illustrate using the $\alpha$ 20 and $\beta$ 22 signals defined in Equations 1 through 6 as stabilizing feedbacks. The basic flight control system was designed using $\alpha_{PROBE}$ 68 and $\alpha_{PROBE}$ 70 feedbacks measured with conventional air data probes. The intent of the simulation was to compare the aircraft's response to atmospheric turbulence when using conventional air data derived signals as opposed to using the inertially derived $\alpha$ 20 and $\beta$ 22 signals for stabilizing feedbacks. The comparisons are shown in FIGS. 8 through 12. It should be noted that the effects of combining these signals, such as complementary filtering probe and inertial navigation system (INS) estimated angles or correcting angle-of-attack sensors for sideslip angle are not demonstrated here.

Figure 8:
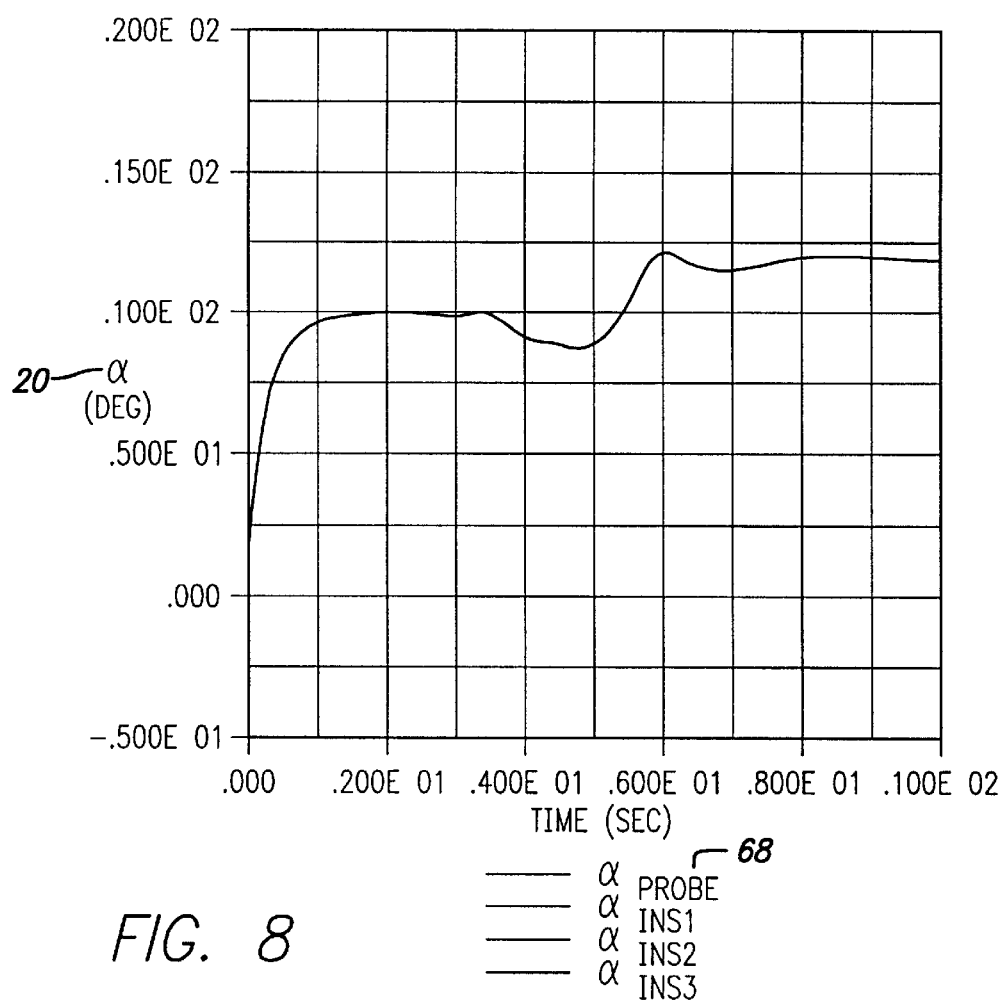
FIGS. 8 through 18 shows graphs for a complete six degree-of-freedom nonlinear simulation of a relaxed stability aircraft including a simulation of a full authority, command augmentation flight control system.
Figure 9:
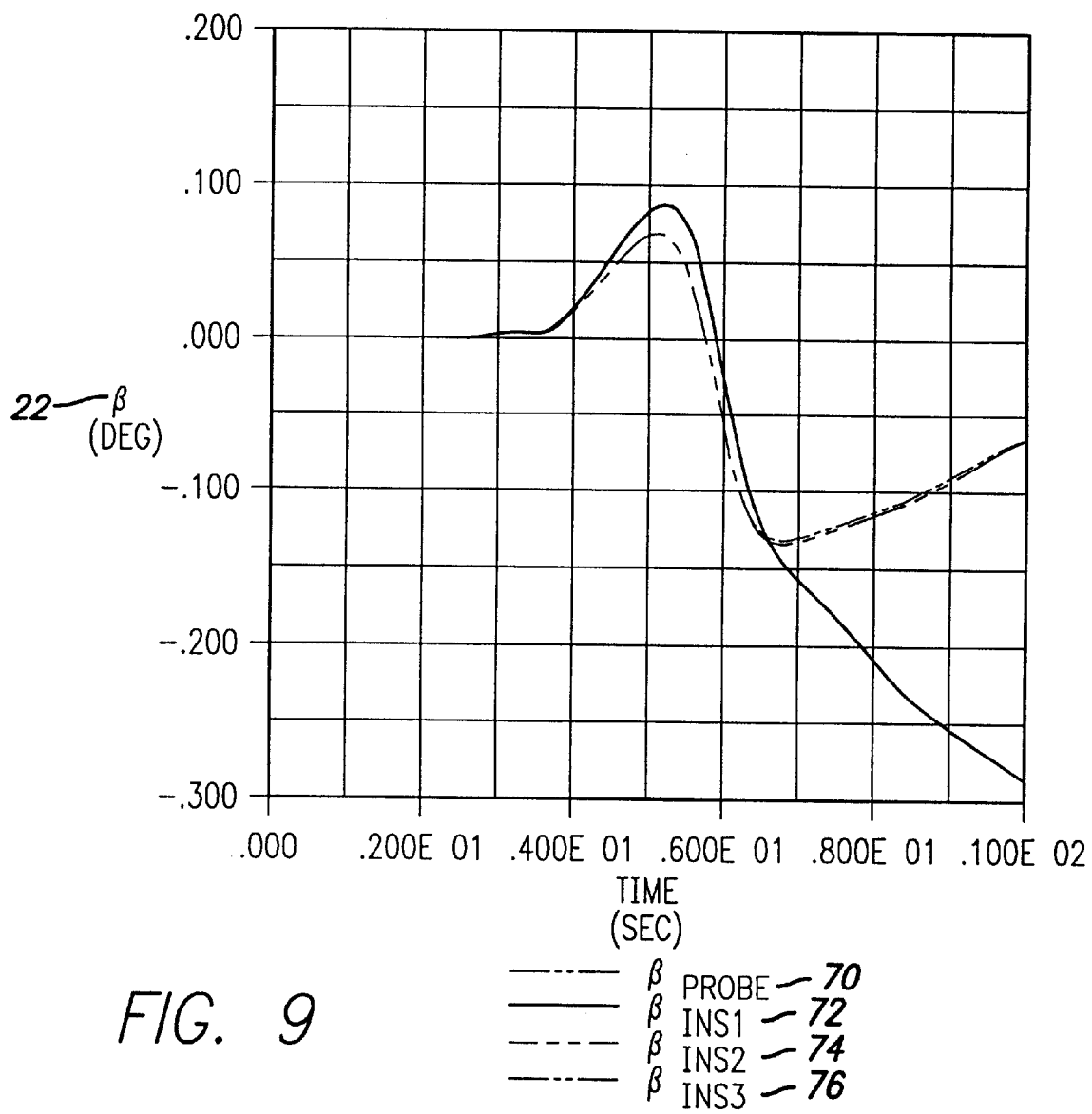

As seen in FIGS. 8 and 9 for pilot inputs, all methods for calculating $\alpha$ 22 gave the correct results for pitch commands, but $\beta_{INS1}$ 72 gave incorrect results for the commanded roll. The values for $\beta_{INS1}$ 72 matched the correct values calculated for $\beta$ 22 only when the wings were level (for zero values of $\phi$ 50). Transformations not included in this simplified derivation would be necessary to account for the aircraft roll angle. Note also the small difference between $\beta_{INS2}$ 74 and $\beta_{INS3}$ 76 that occur due to small numerical errors in the angular calculations of the latter.

Figure 10:
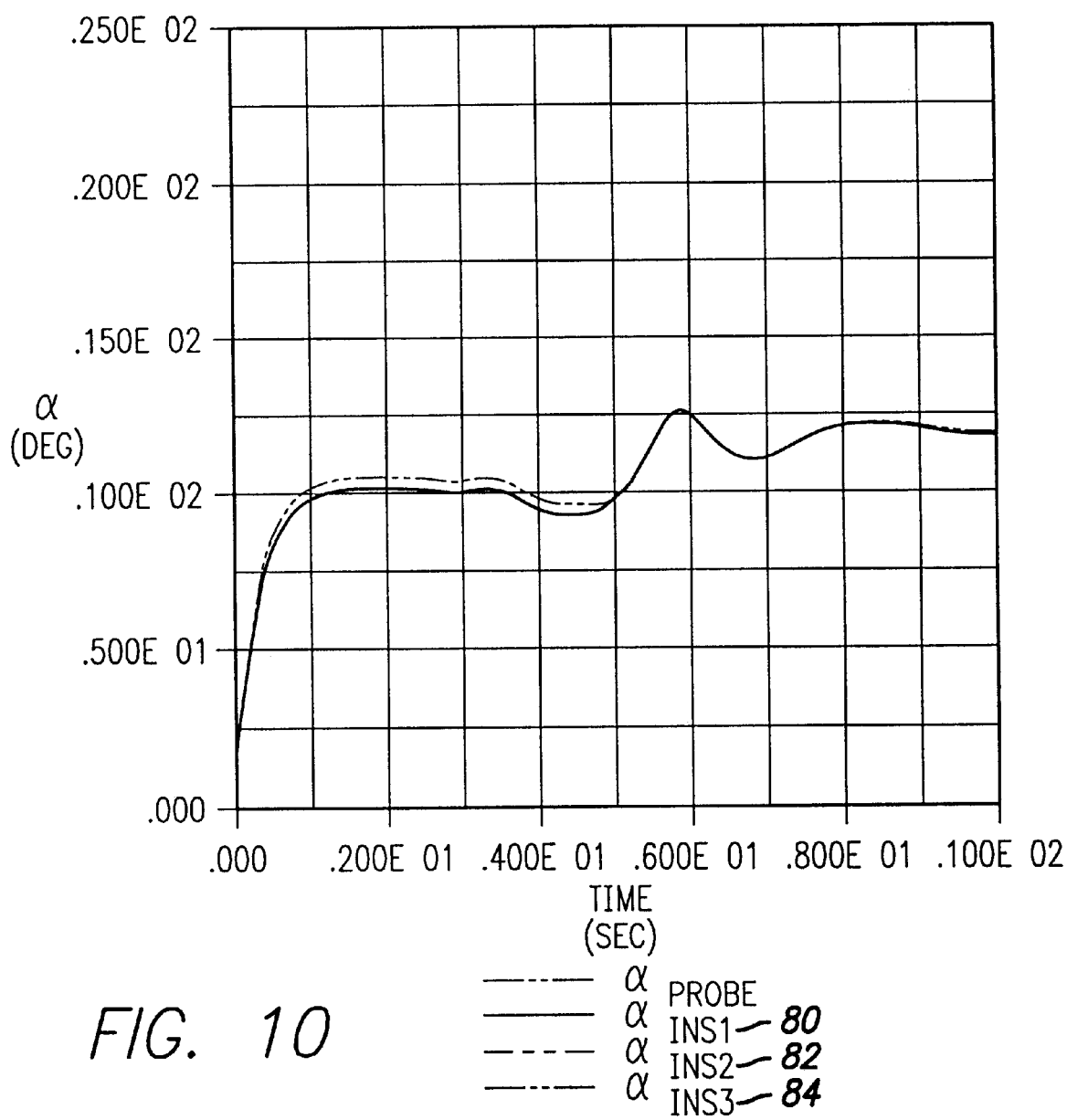
Figure 11:
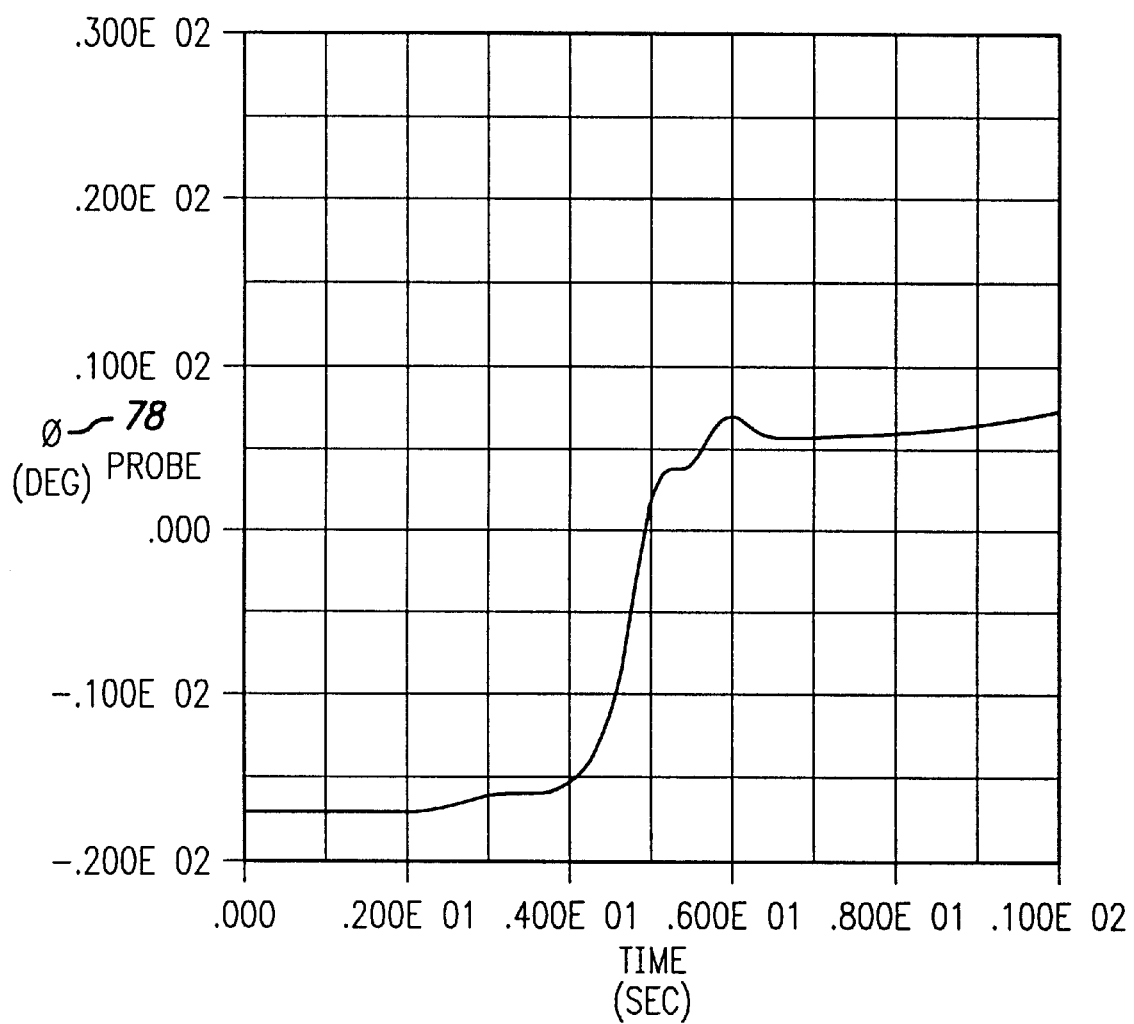
Figure 12:
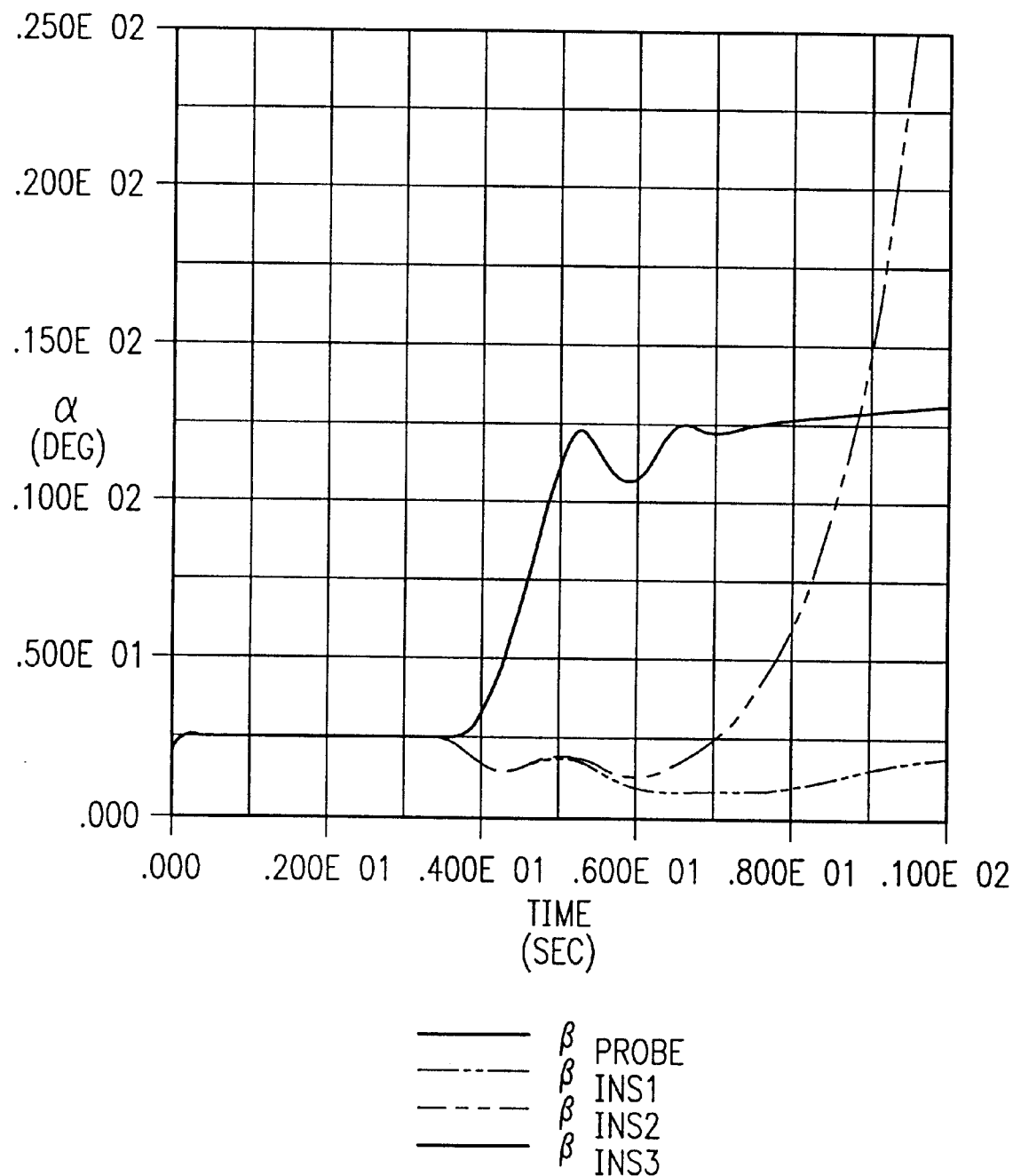
Figure 13:
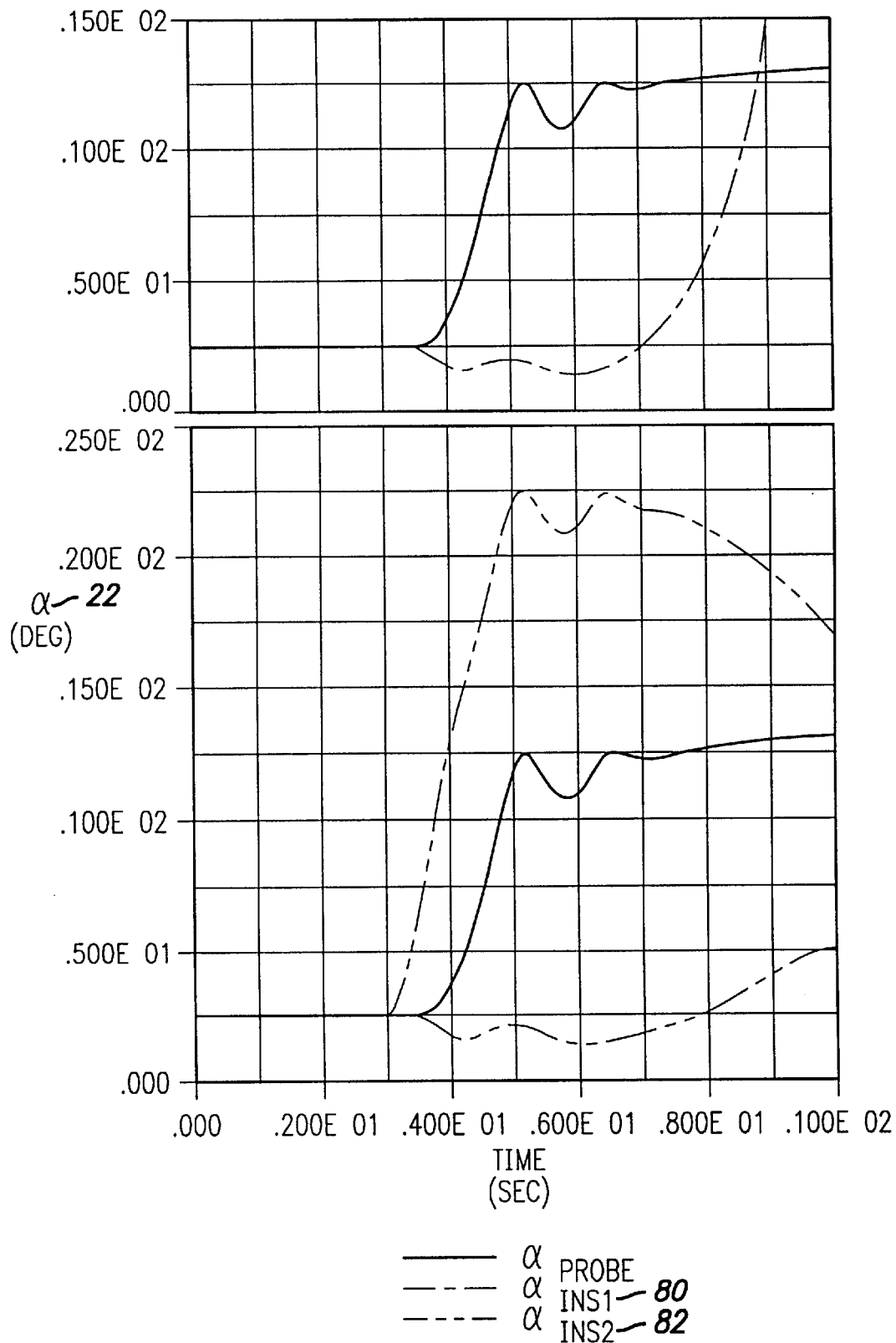
Figure 14:
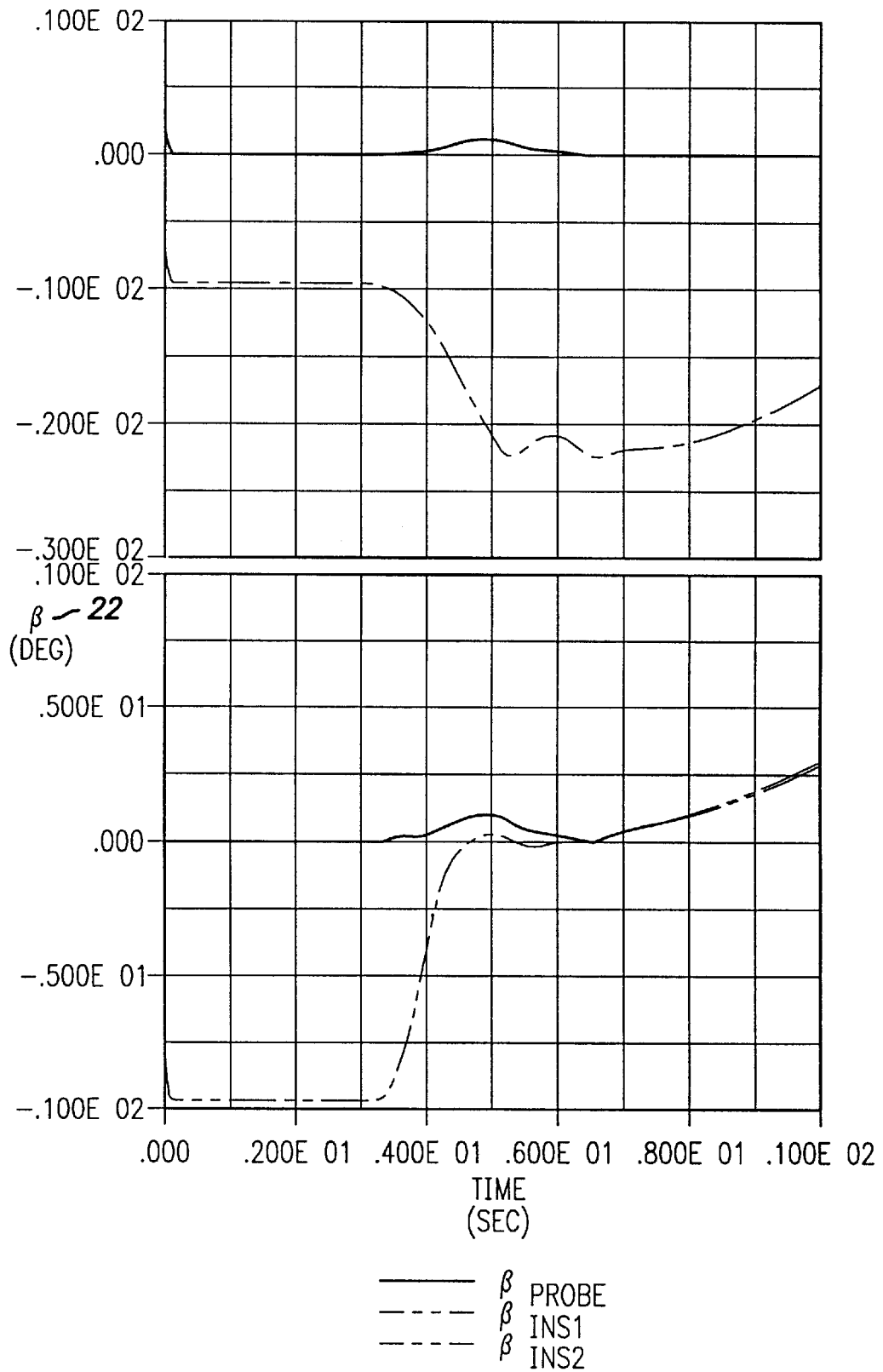

A similar effect is seen in the calculation of $\alpha$ 22 during a roll. In FIGS. 10 and 11 the aircraft is trimmed to an initial $\phi$ 78 (the roll angle) of −17°. This drives the values of $\alpha_{INS1}$ 80 and $\alpha_{INS2}$ 82 to a value less than the true angle-of-attack given by $\alpha_{INS3}$ 84. Note that these values agree after $\phi$ 78 is reduced to less than ~±10°. As shown in FIG. 12, when a roll is made to a bank angle of 80° it is seen that equations 1 and 2 become unusable. When this maneuver is performed in a constant easterly wind (aircraft heading north), none of the methods give the correct values for $\alpha$ 22 and $\beta$ 24 as shown in FIGS. 13 and 14. In FIG. 13, $\alpha_{INS3}$ 84 incorrectly gives a value of $\alpha$ 22 greater than 15°, which would cause an α-limiter to inadvertently become engaged. As shown in FIG. 14, the sideslip angle $\beta$ 22 calculated by equations 5 and 6 senses the aircraft motions with respect to the ground rather than to the air mass.

Figure 15:
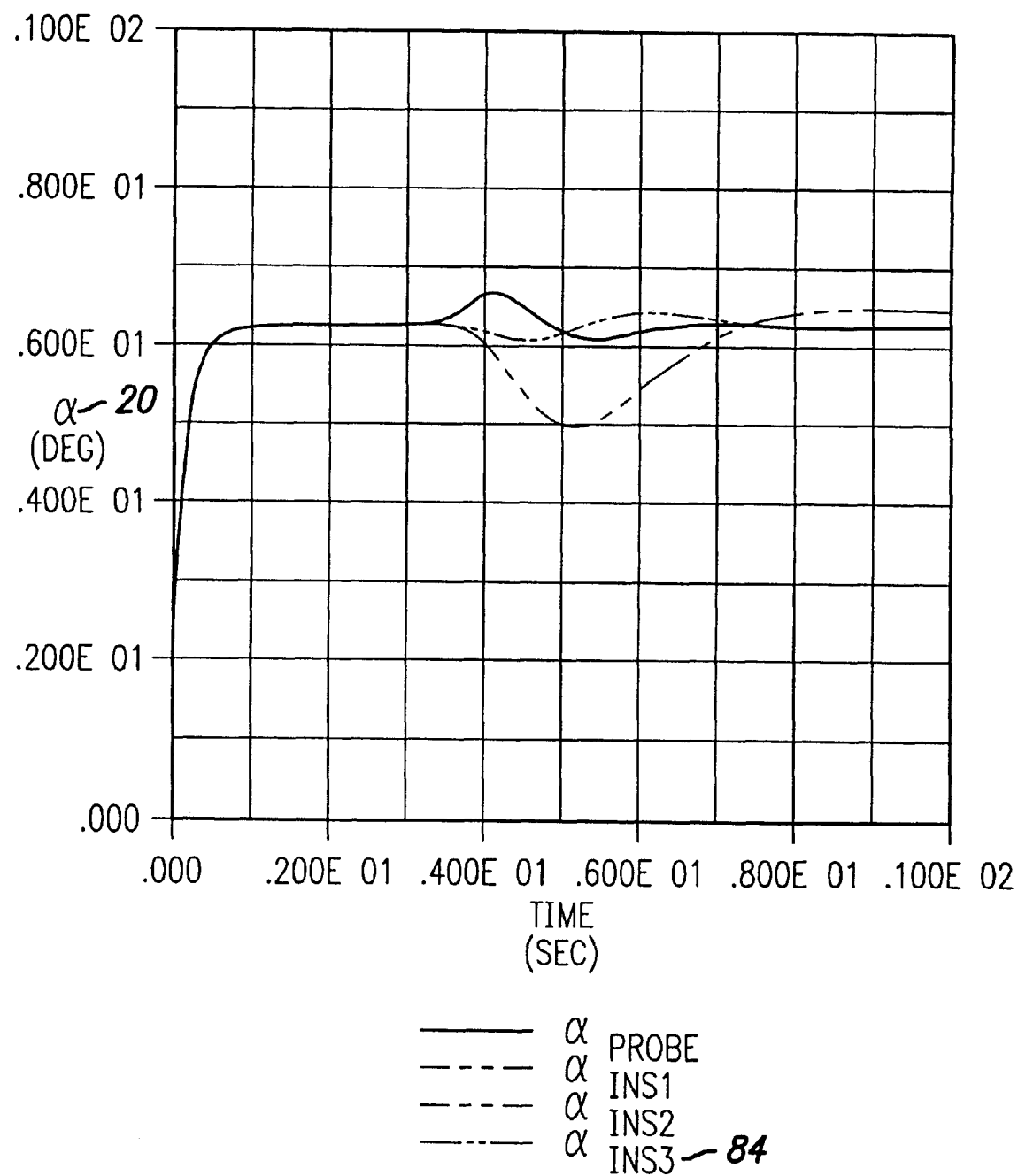
Figure 16:
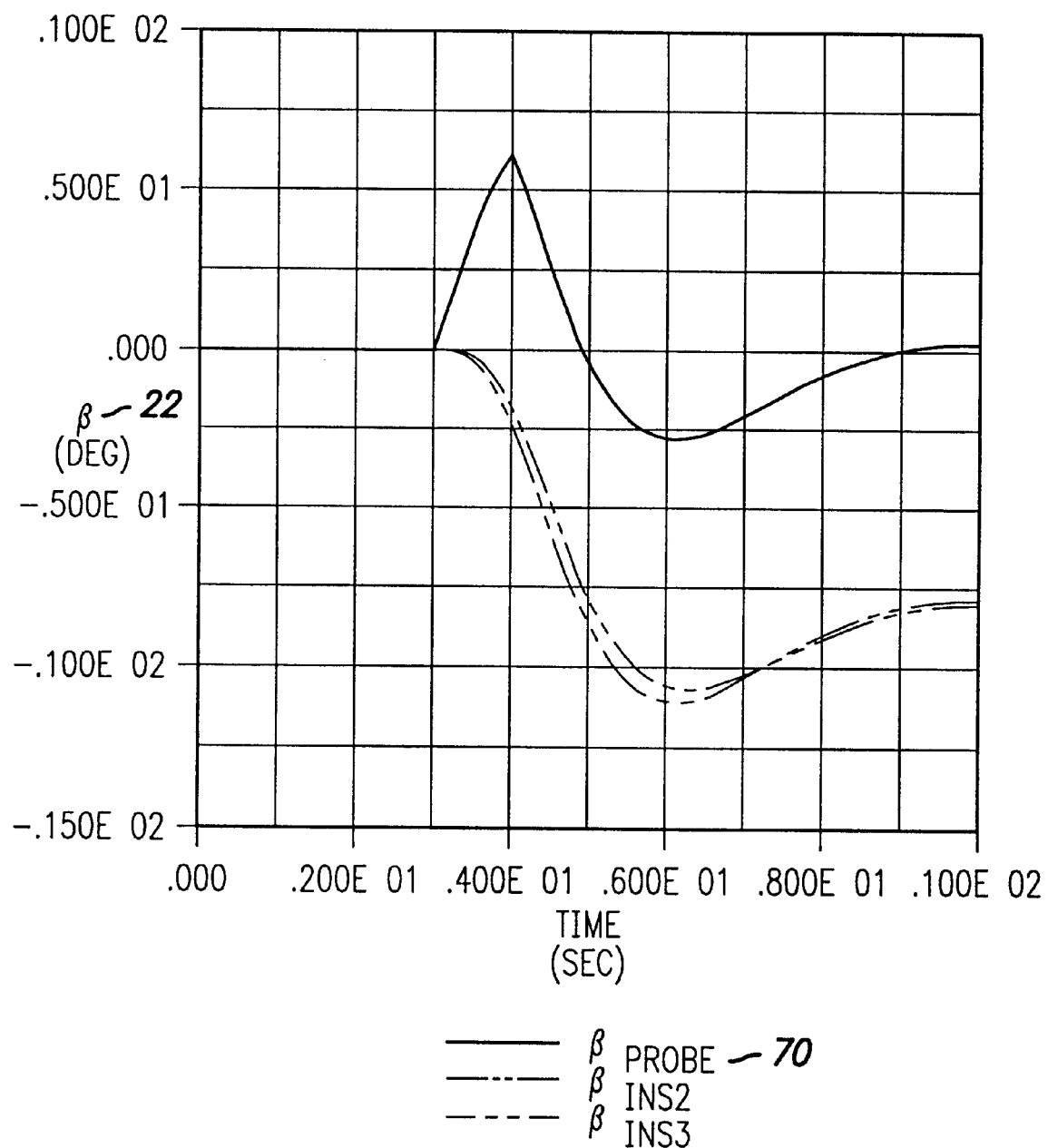
Figure 17:
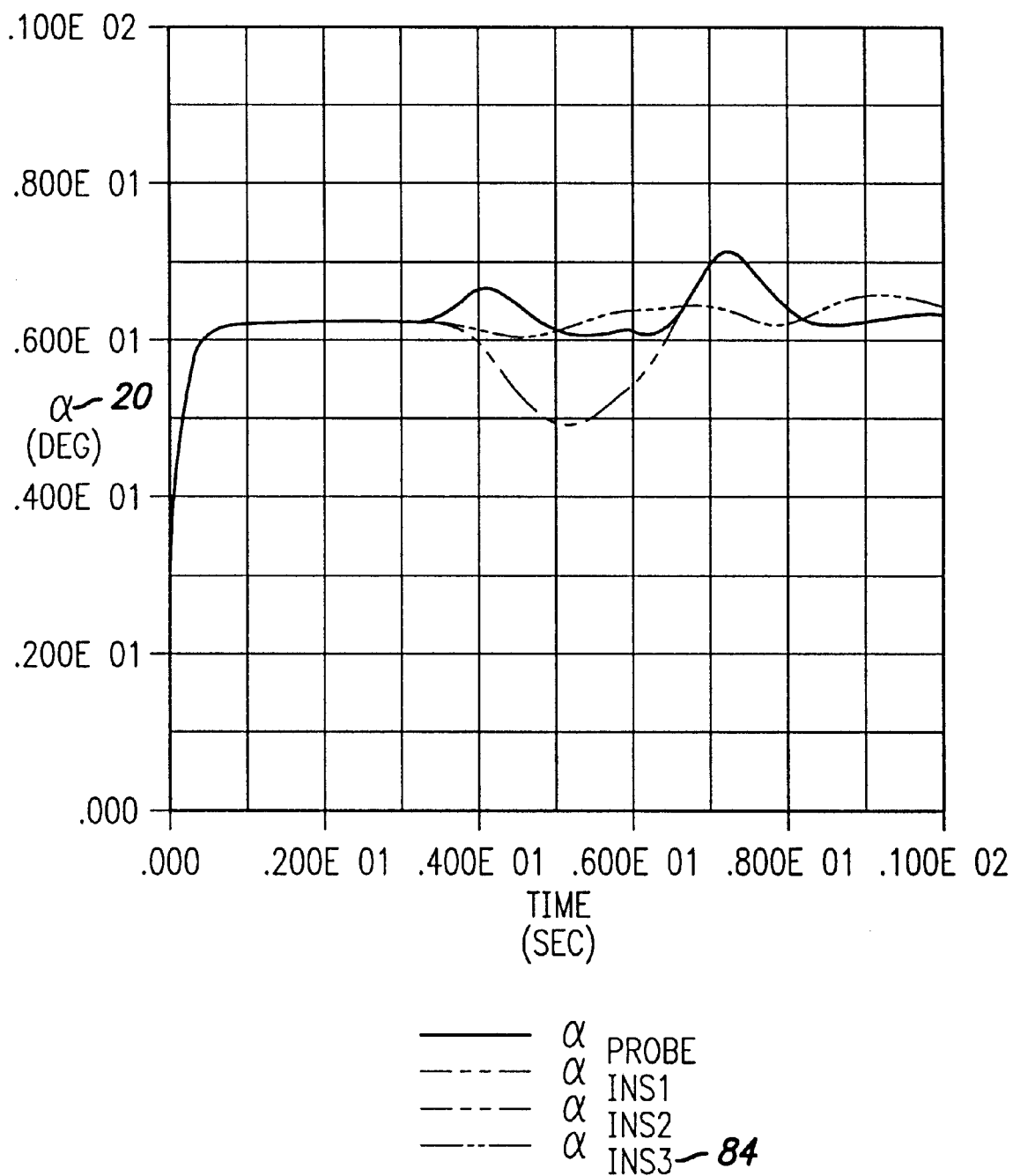
Figure 18:
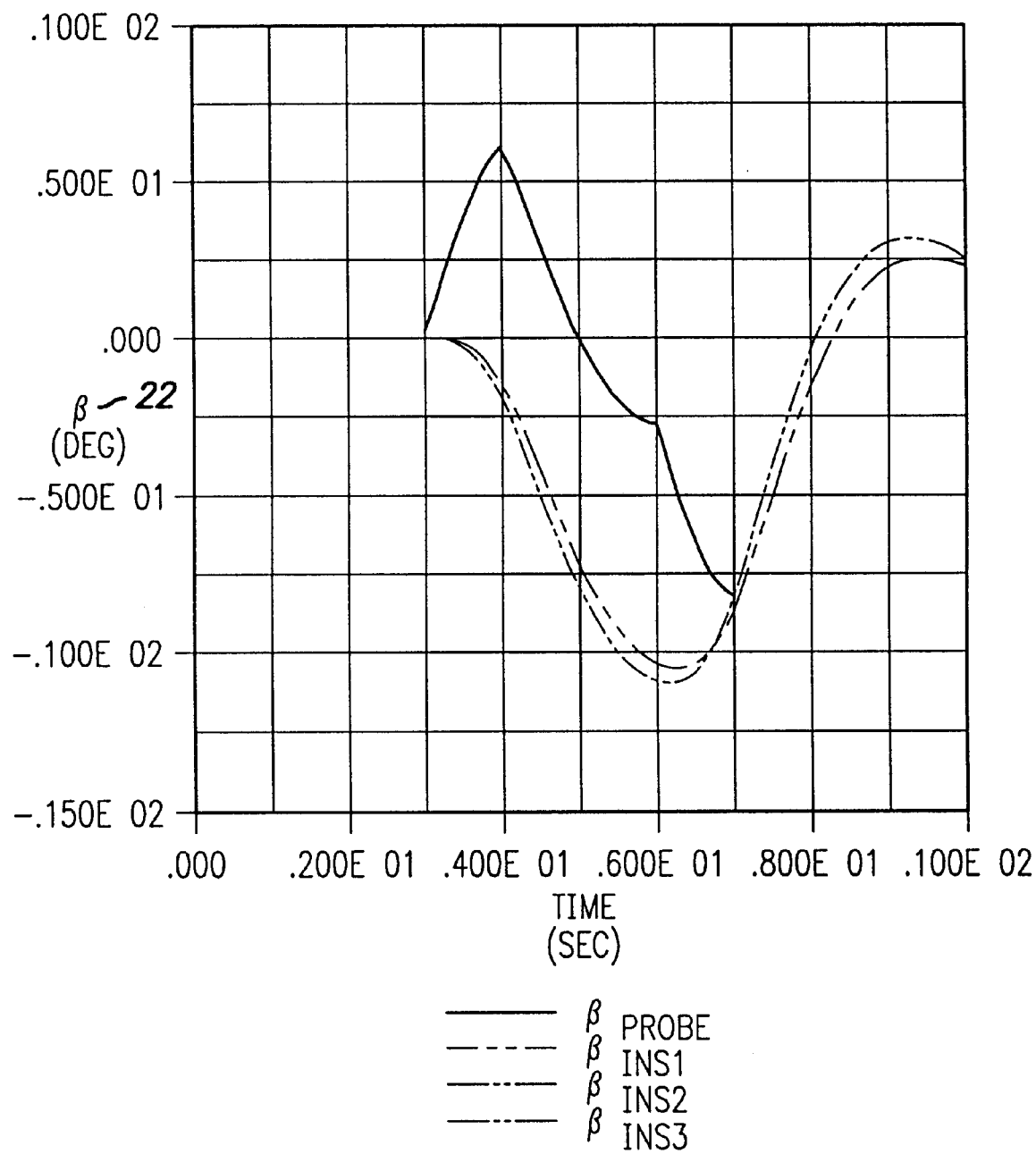

The effect of changing winds on the inertial angular measurements is demonstrated in FIGS. 15 and 16. A side gust is ramped in at three seconds over the following second. The value of $\beta$ 22 calculated inertially misses the component of sideslip due to the changing wind. Only the tendency of the aircraft to return to zero sideslip angle is sensed, leading the uncorrected inertial measurements to incorrectly measure a negative value of $\beta$ 22. When the wind reaches a constant value, all of the variations in $\beta$ are again inertial, but the measured value of $\beta$ 70 is offset by the error measured in $\beta$ 22 when the wind became constant. The uncorrected inertially sensed body axis velocity components are no longer properly aligned with the true aircraft velocity vector, so that the value of $\alpha_{INS3}$ 84 measured using the body axis velocities also contains an offset error. When the wind is removed two seconds later as in FIGS. 17 and 18 the offset error in inertial $\beta$ is also removed. The value of $\alpha_{INS3}$ 84 also returns to the correct value as the sensed body axis velocity vector returns to the proper orientation with respect to the total velocity vector including winds. The value of $\alpha$ 20 measured by equations 1 and 2 does not return to the correct value after the gust.

Figure 19:
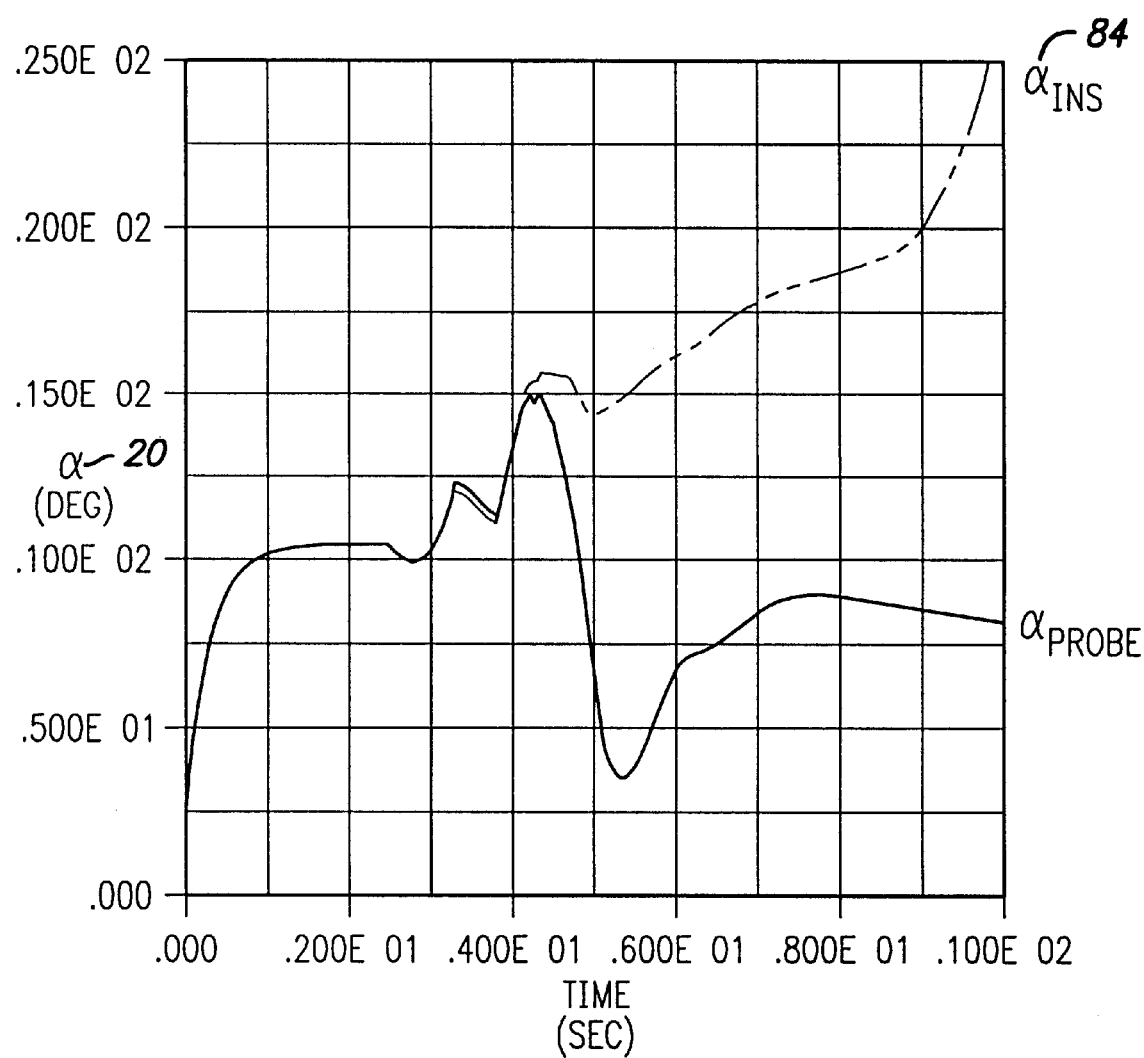
FIGS. 19 through 31 shows graphs for the simulation of the turbulence encountered during landing approach by an instrumented aircraft.
Figure 20:
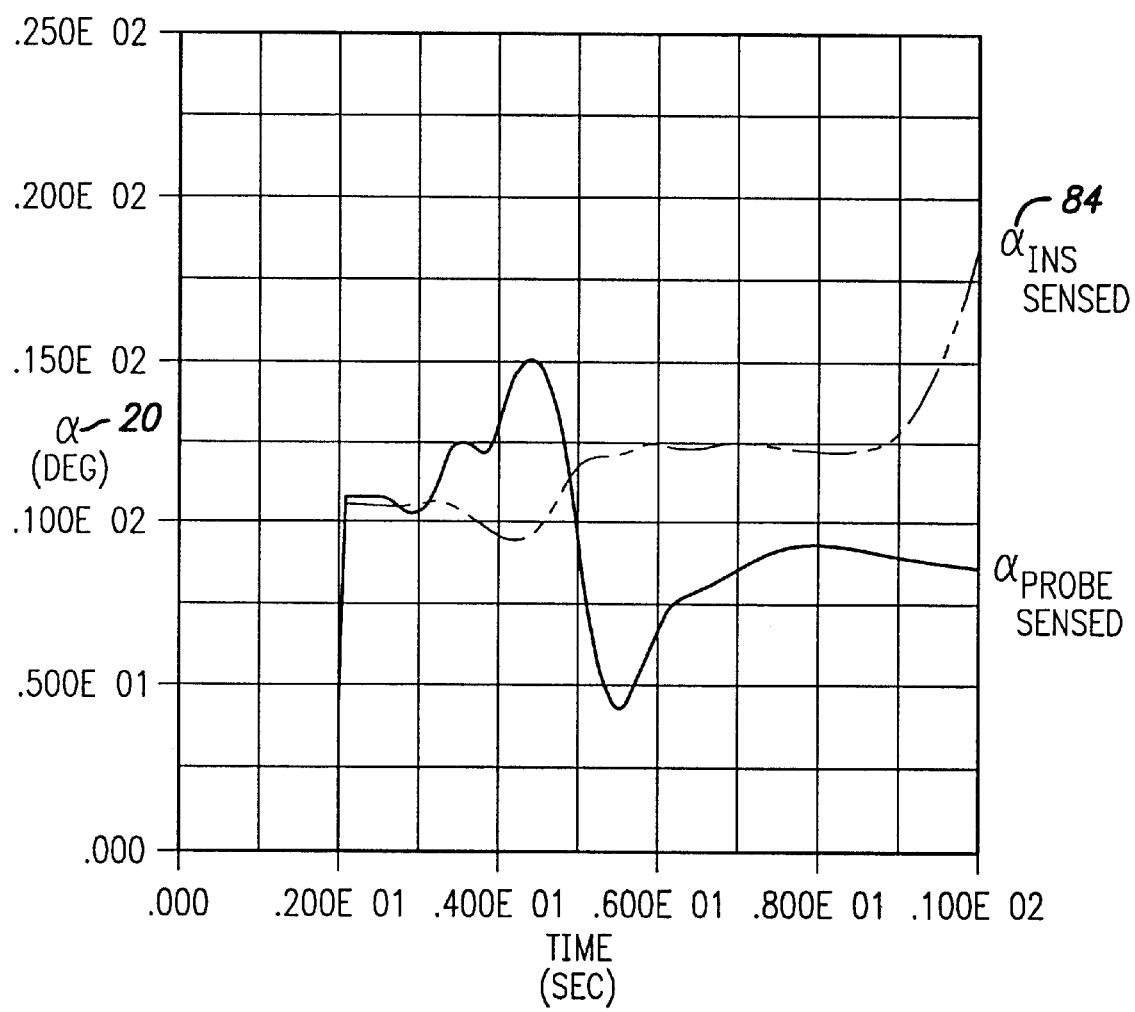
Figure 21:
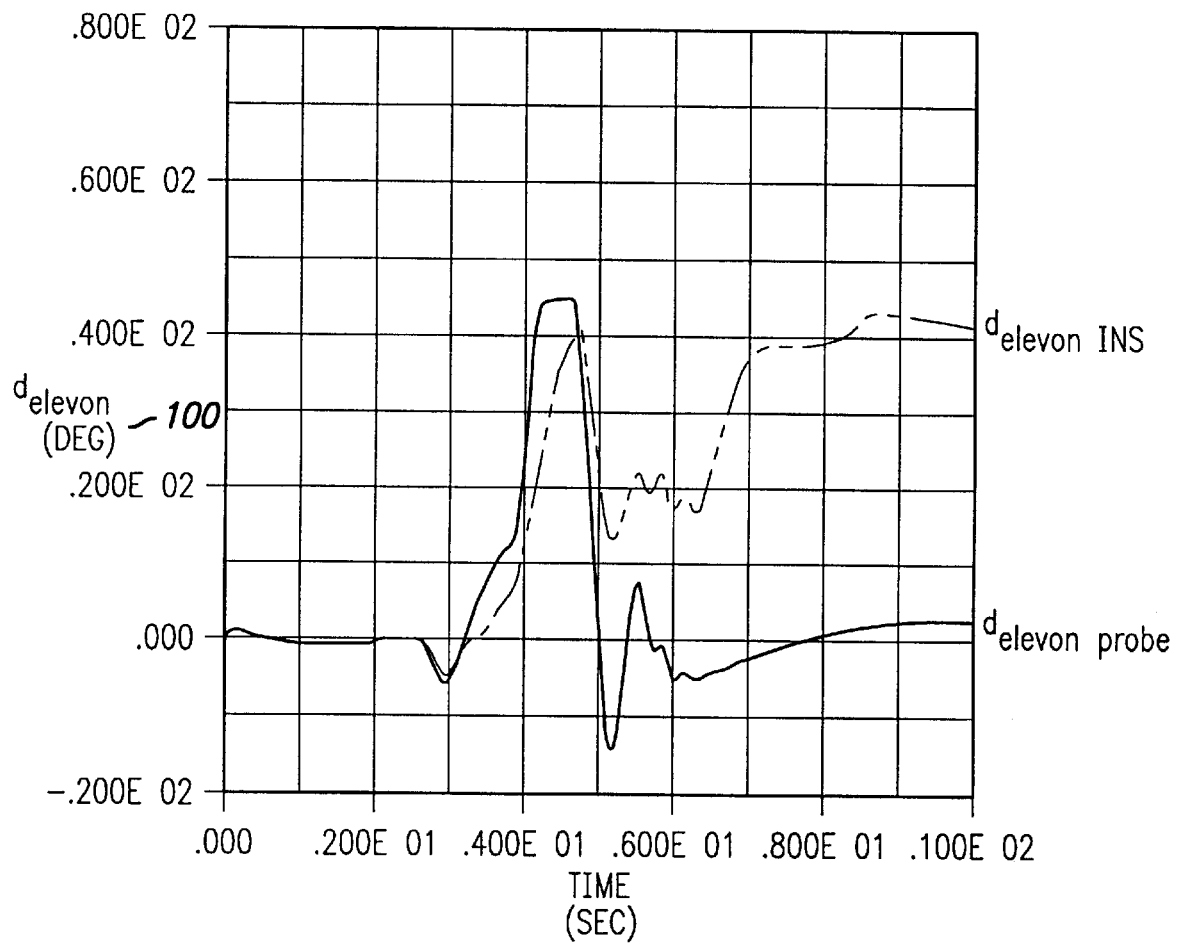
Figure 22:
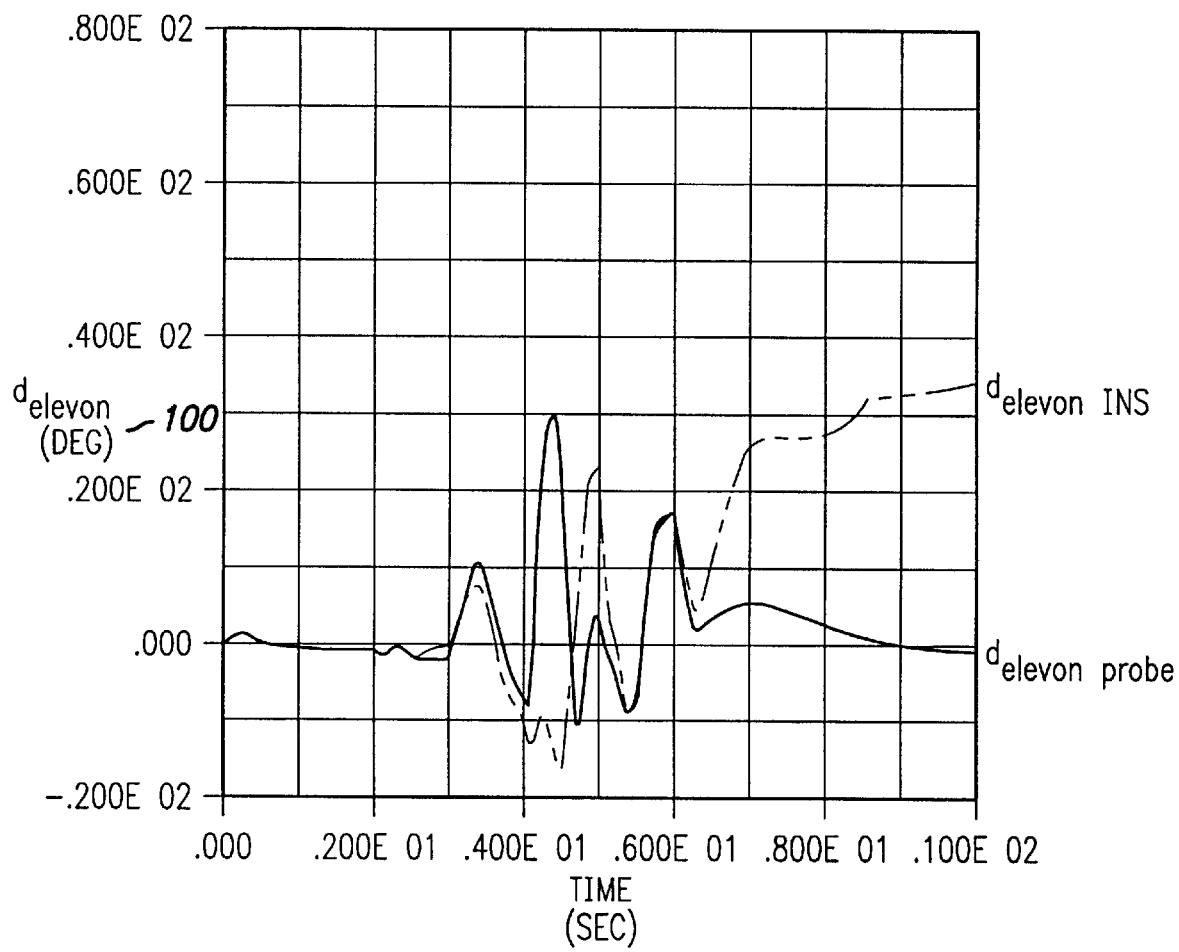
Figure 23:
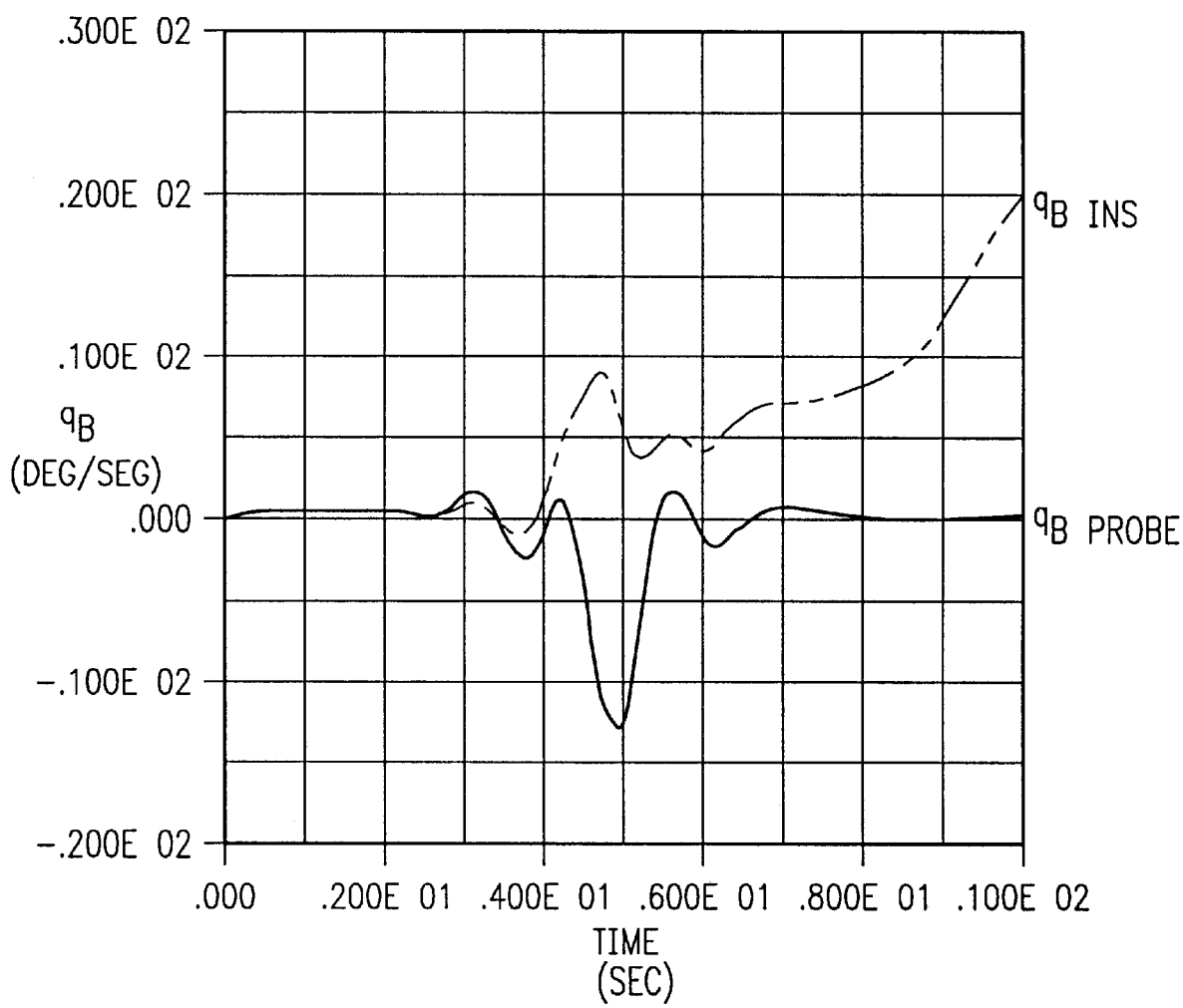
Figure 24:
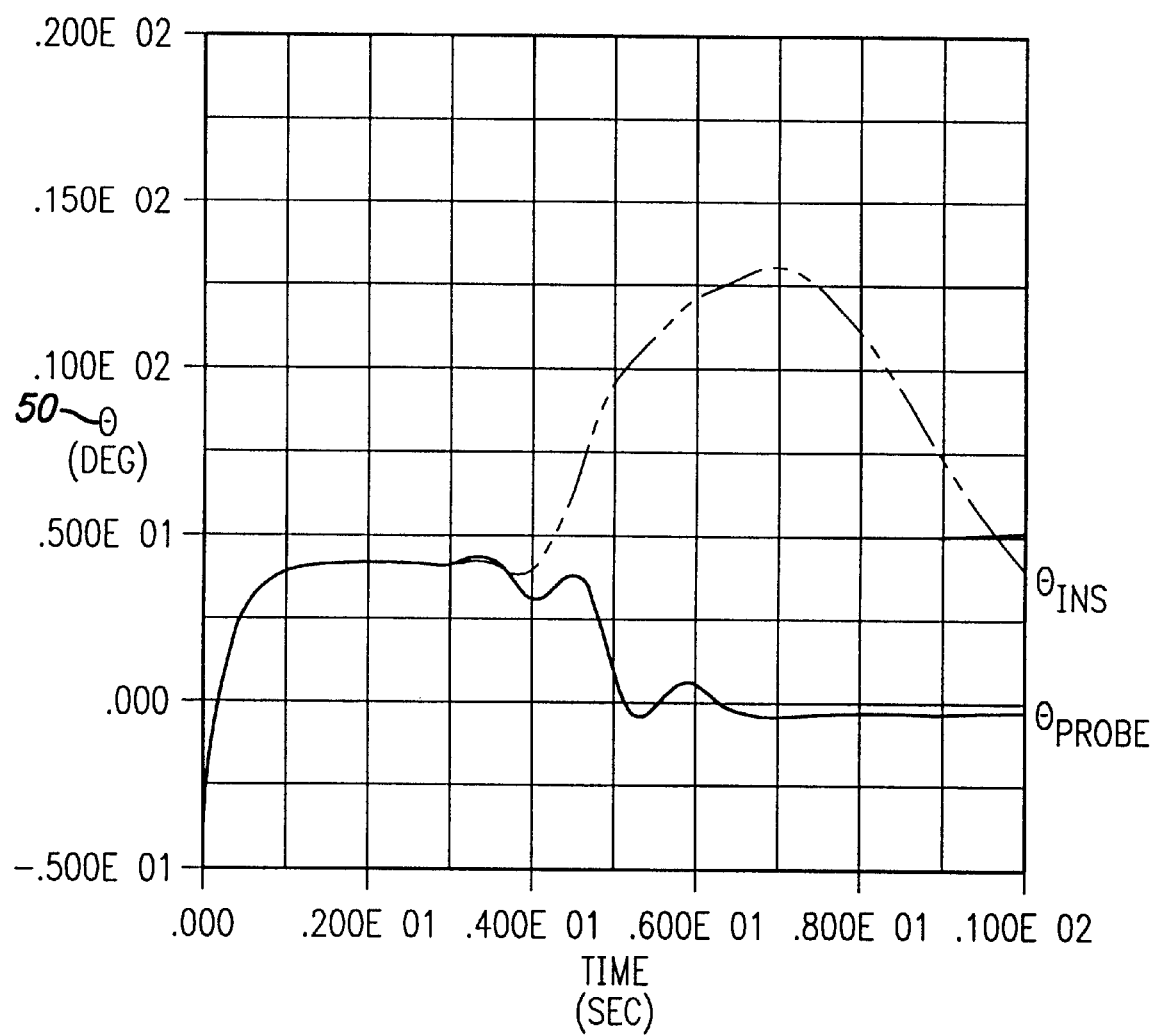

The effects of these errors on the inertial measurements are shown in FIGS. 19 through 31. This is a simulation of the turbulence encountered during landing approach by an instrumented aircraft. This turbulence resulted in an $\alpha$ excursion of 15° in 11° of $\beta$ for the simulated aircraft in the approach configuration. Full down elevon was commanded by the pitch limiter to counter this large α. These plots show a comparison of the aircraft response feeding back $\alpha$ and $\beta$ measured by the probes and using $\alpha_{INS3}$ and $\beta_{INS2}$ as feedbacks. FIG. 19 shows that $\alpha$ 20 diverged when a loop closure on inertial angle-of-attack was used. As seen in FIG. 20, the aircraft has departed in pitch well before the pitch limiter has been engaged by $\alpha_{INS3}$ 84 feedback. In FIGS. 21 and 22, maximum elevon 100 deflection has been commanded when $\alpha$ from the probes is used in the loop closure. This command is delayed and is not as large in magnitude when using $\alpha_{INS3}$. FIG. 23 shows that the pitch rate which results when $\alpha_{PROBE}$ is used as the feedback reduces the angle-of-attack and that body axis pitch rate ($Q_B$) 102 returns to a steady-state value of zero. The pitch rate experienced using $\alpha_{INS3}$ feedback causes divergence in pitch. As shown in FIG. 24, the pitch attitude (θ) 50 was driven after the gust to 13° by using $\alpha_{INS3}$ as a flight control system feedback.

Figure 25:
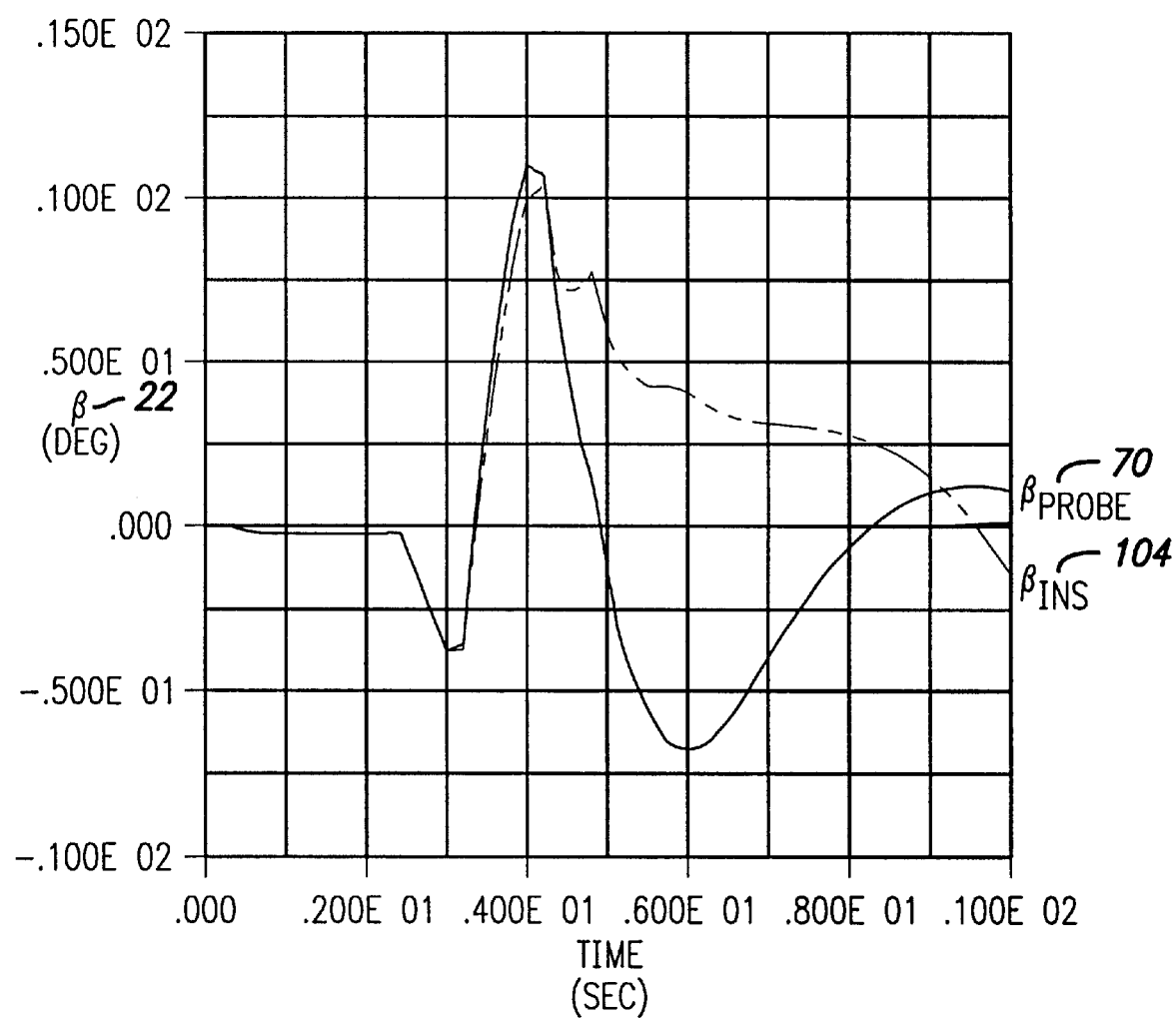
Figure 26:
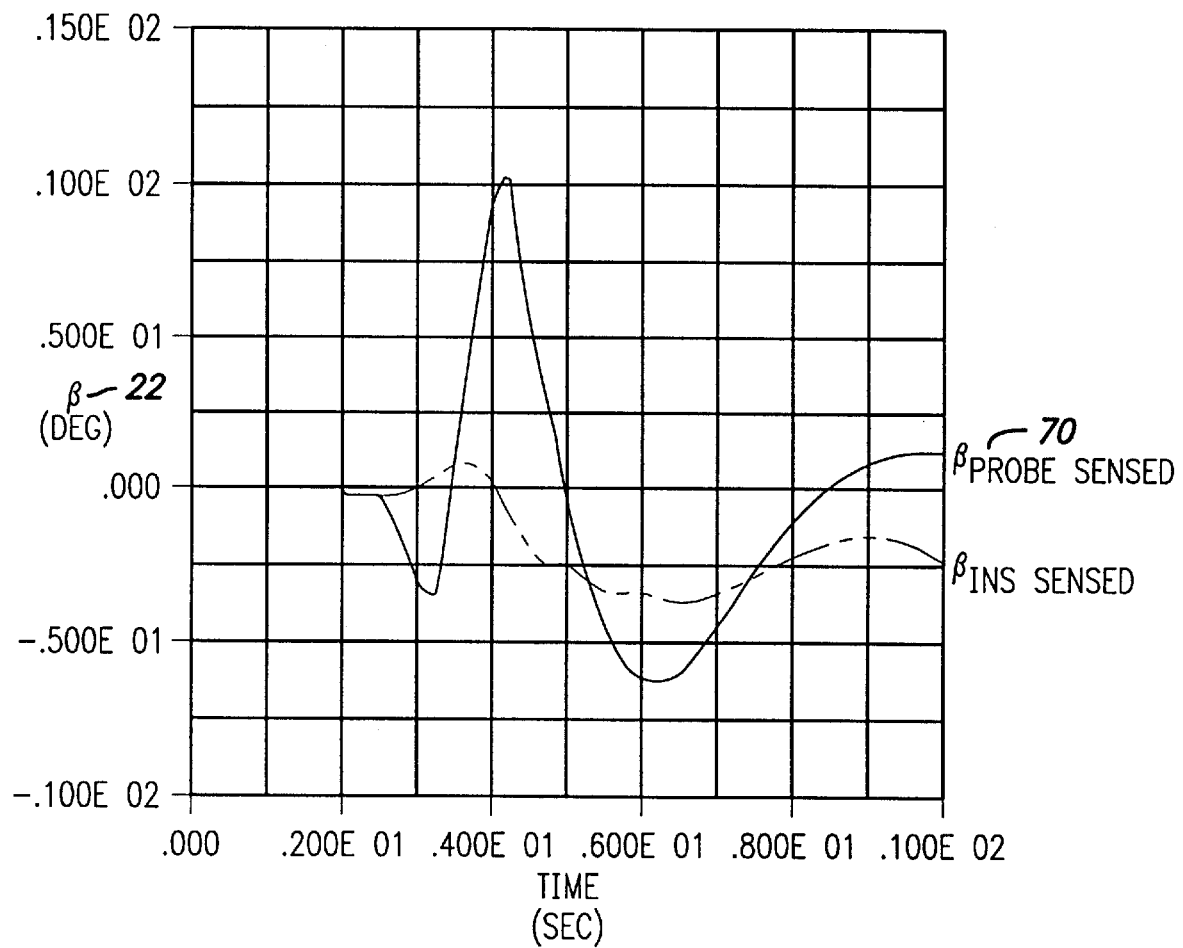
Figure 27:
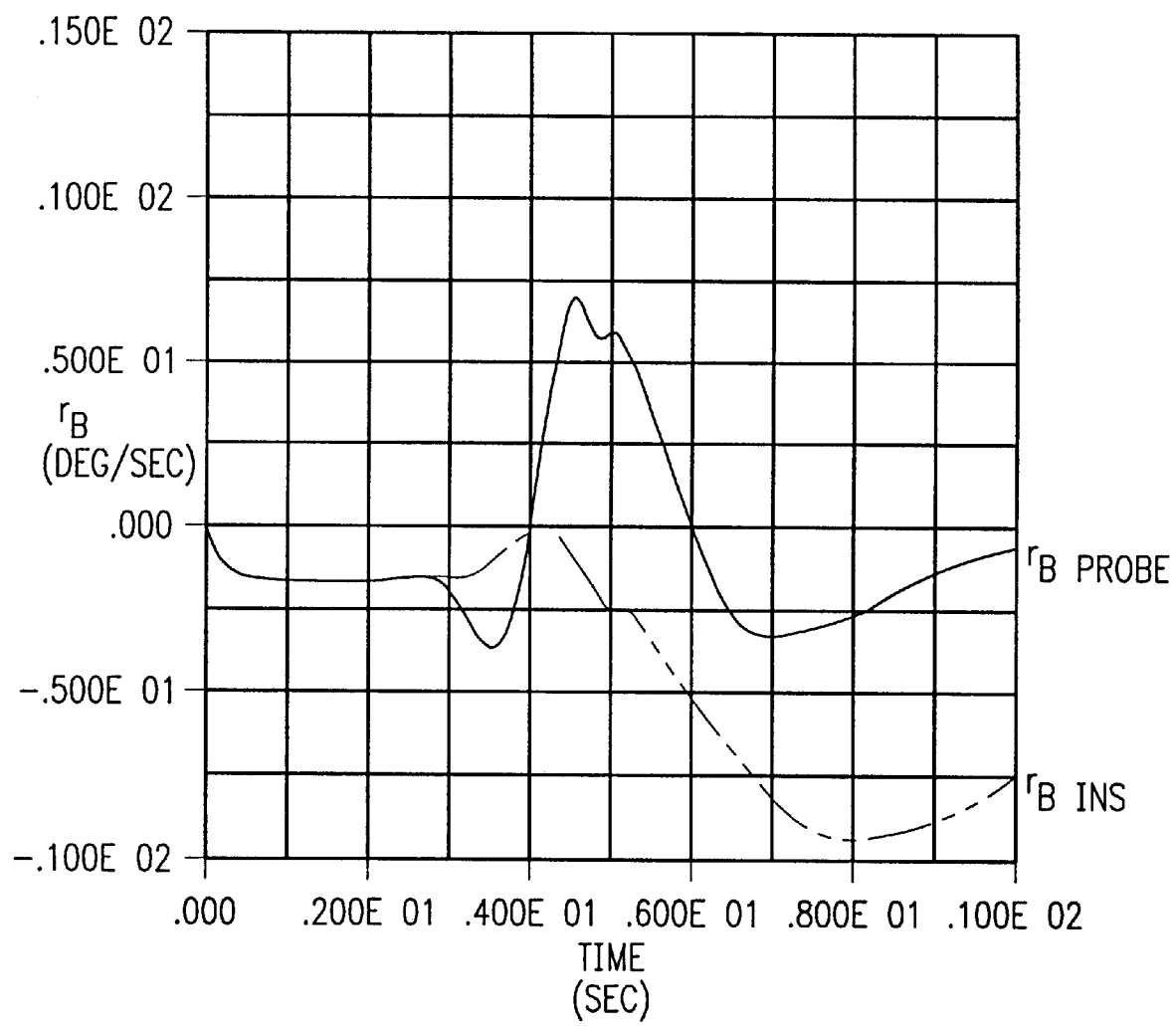
Figure 28:
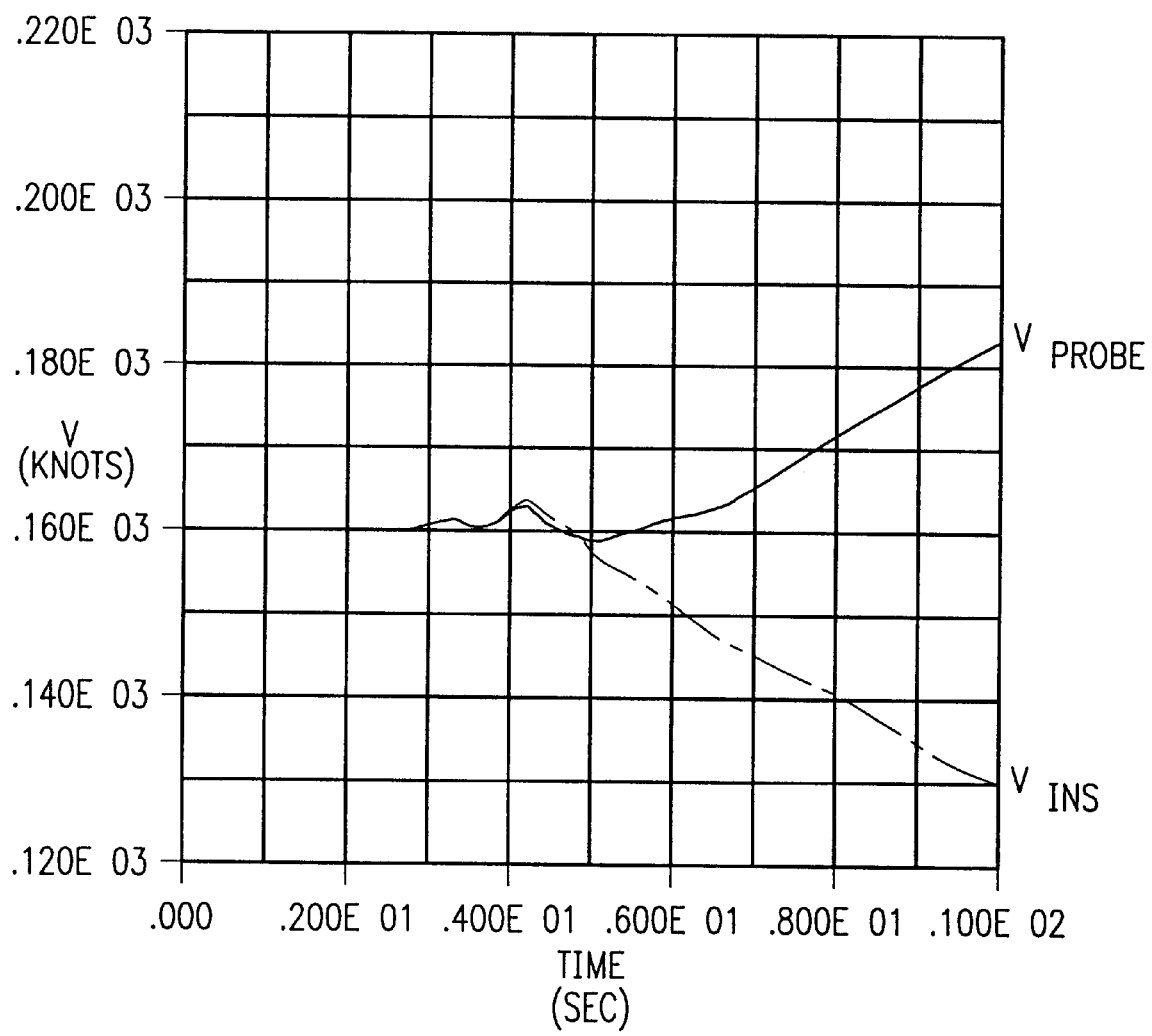
Figure 29:
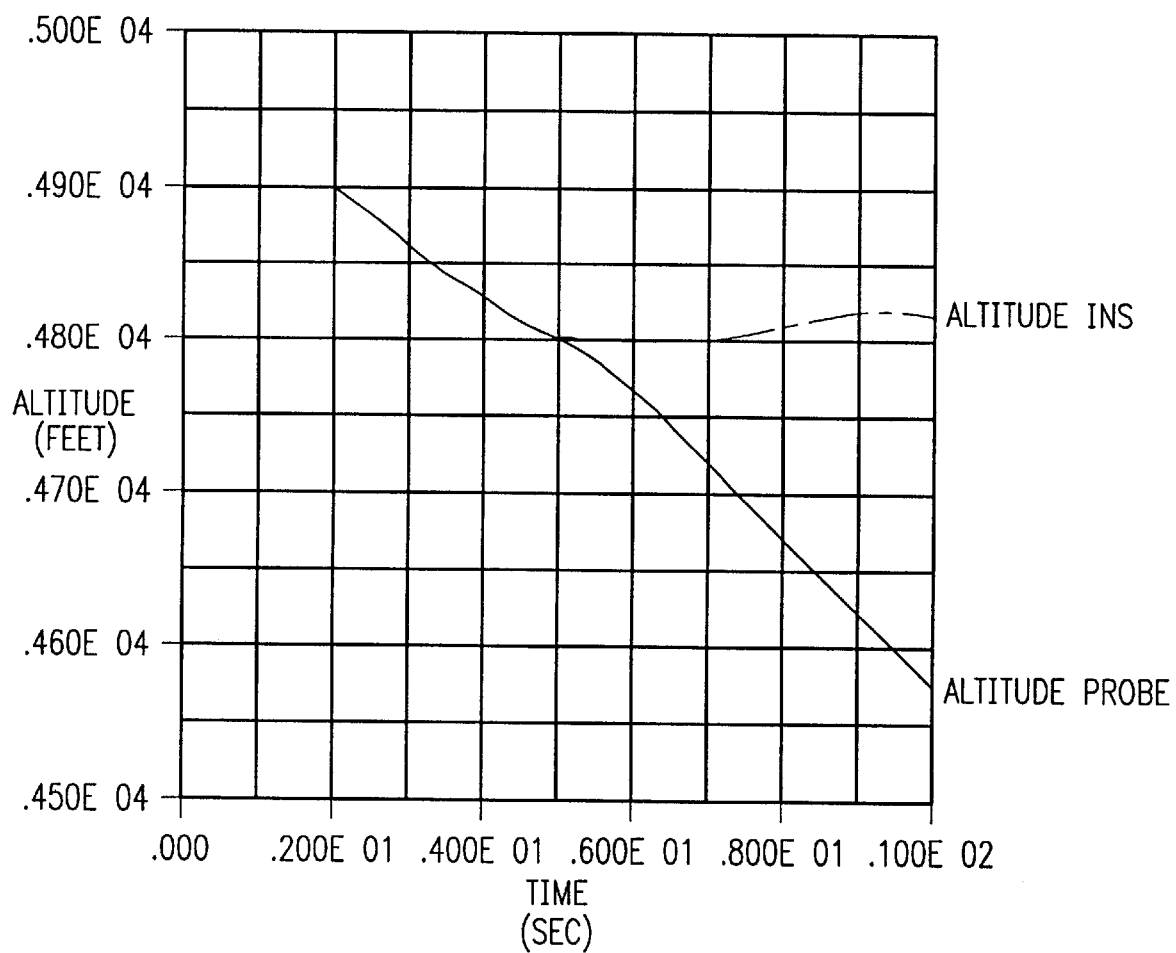
Figure 30:
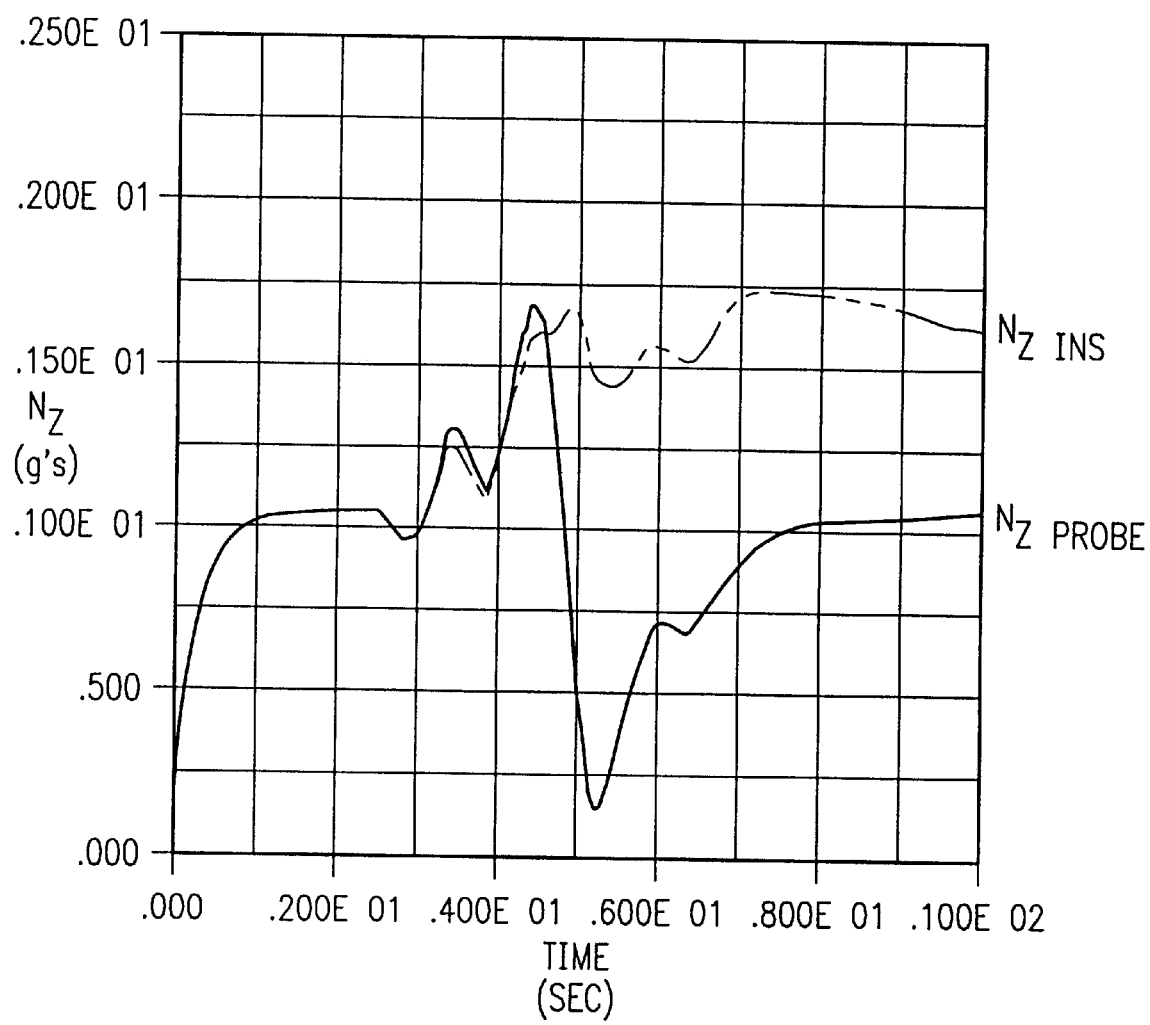
Figure 31:
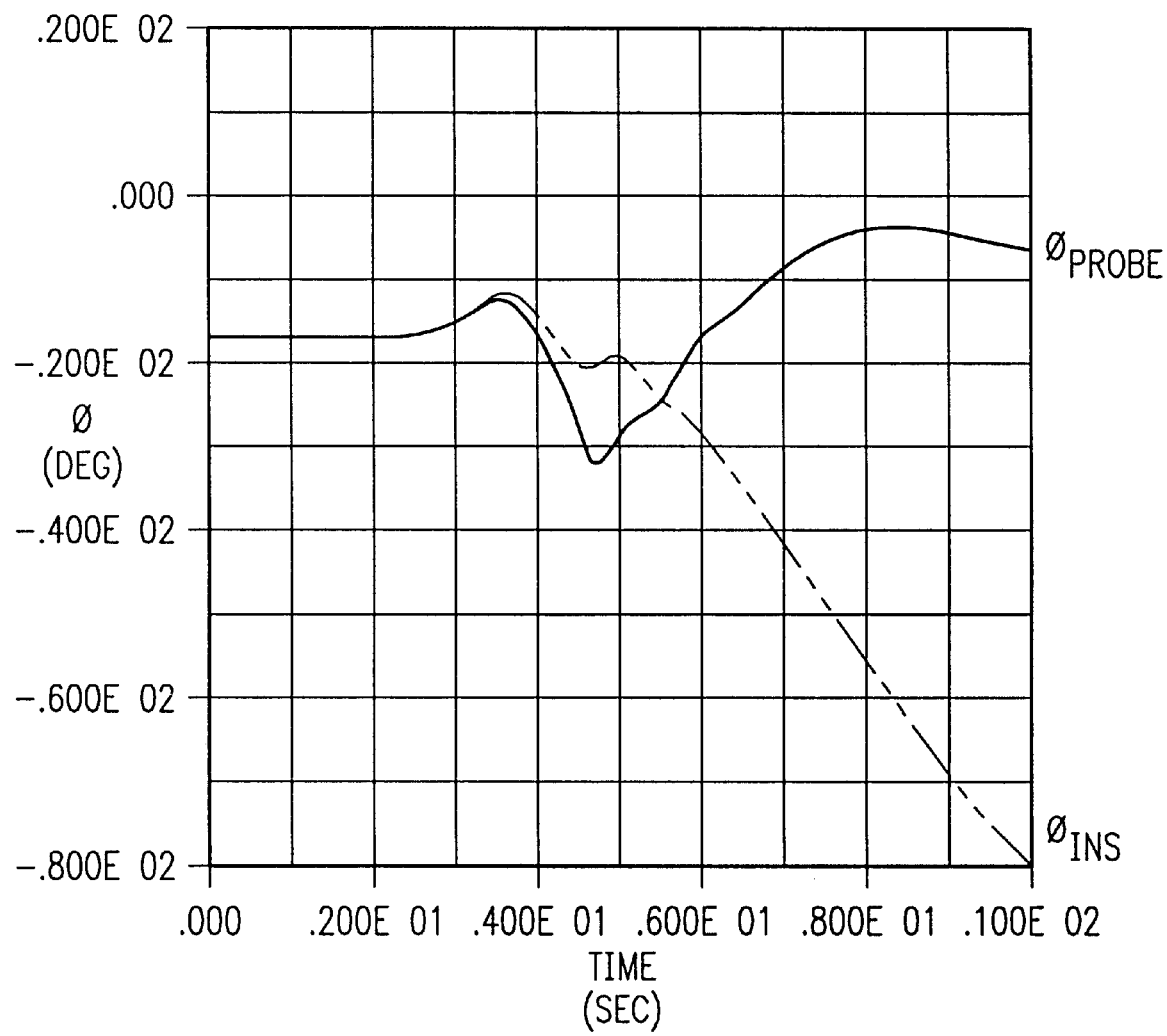

FIGS. 25 and 26 show the actual and sensed sideslip angles experienced by the two feedback methods. Feedback of $\beta_{PROBE}$ has brought the sideslip angle back to a value approaching zero. The sideslip angle using $\beta_{INS2}$ 104 feedback is not approaching a constant value. This is due to the uncorrected inertial system only sensing the aircraft dynamics resulting from the gust. As seen in FIG. 26 the large $\beta$ 22 excursion was not sensed in the uncorrected inertial measurement. The roll rate during this gust is of the incorrect sign during the excursion due to the erroneous uncorrected sideslip feedback. It also shows that sideslip angle is still increasing as shown in FIG. 27. In FIG. 28, the velocity has dropped to 130 knots and the aircraft has pitched up despite the application of full thrust. Instead of descending, the altitude has slightly increased, at the expense of aircraft velocity as shown in FIG. 29. Thus, load factor has been maintained above 1.5 g's as shown in FIG. 30. Referring to FIG. 31, the aircraft with inertial feedbacks has been driven to a roll angle of 80° by this maneuver.

The above results indicate that when using only inertial values for control system feedbacks in a relaxed stability aircraft there is a need to include a correction for the turbulence estimate. In the basic kinematic relationship shown in equation 7:

$$F = m \cdot a \qquad \text{(Equation 7)}$$

Figure 32:
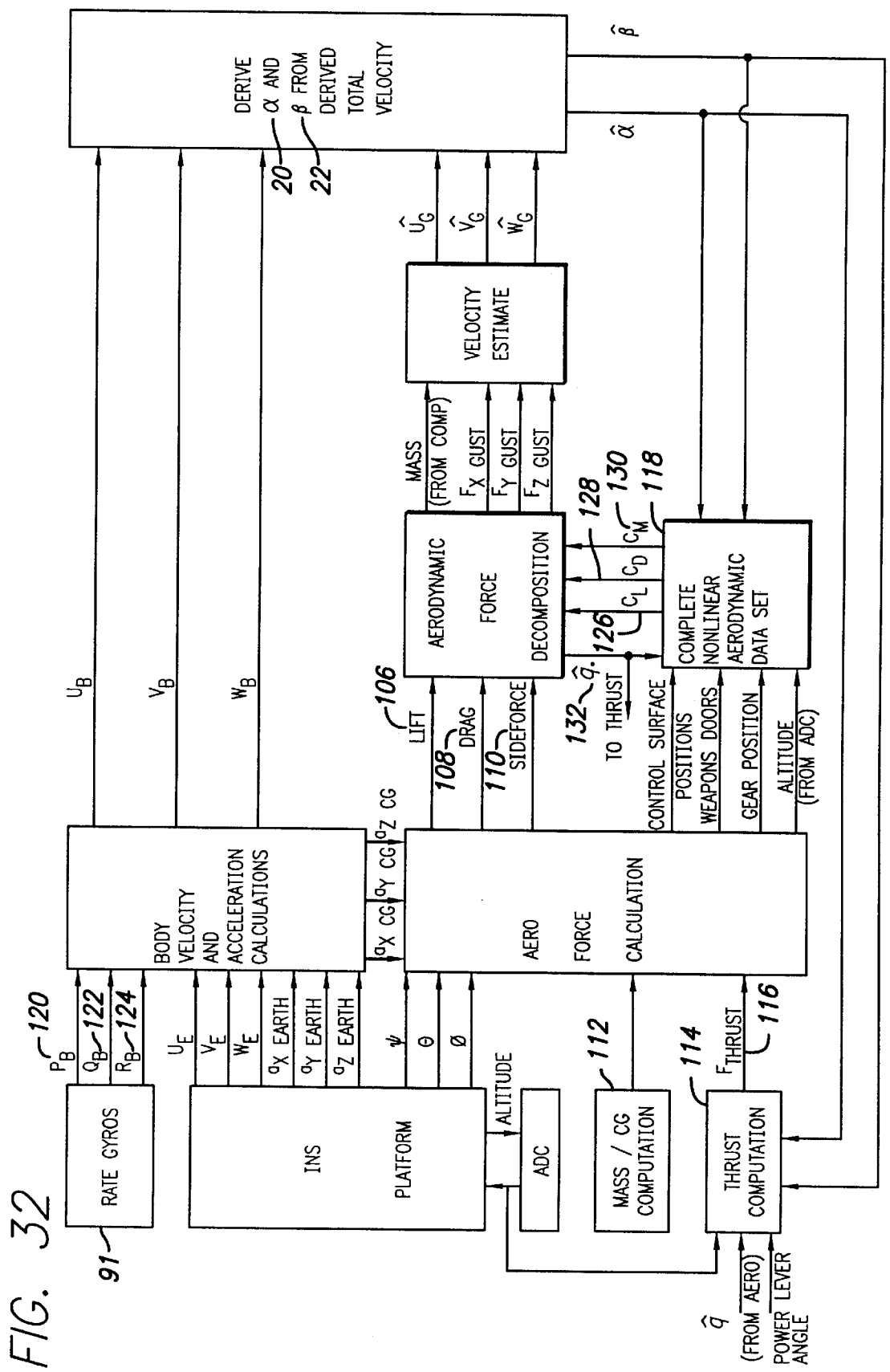
FIG. 32 is a block diagram for illustrating the process required to determine the effects of turbulence using internal navigation system measurements in accordance with the present invention.

The true accelerations relative to an inertial frame are what the INS measures. The mass of the vehicle is known by accurately recording the aircraft's mass before take-off and by updating this information during flight with fuel management and stores release information. Since the accelerations in Equation 7 are directly measured, and the mass can be estimated closely, it is clear that the total forces acting on the vehicle can be determined. A practical consideration is that the aerodynamic forces acting on the vehicle are only one part of the total acting forces (i.e. propulsion system misalignments, et cetera). The estimated aerodynamic forces would also be adversely affected by some of the threats to a conventional air data system (i.e. bird strikes, icing, and hostile action). Referring now to FIG. 32, there is shown a block diagram for illustrating with the following description the process required to determine the effects of turbulence using INS measurements.

Referring to FIG. 32, the forces experienced by the aircraft can be broken up into the body axis forces and the forces due to atmospheric turbulence. Expanding the above equation to account for rotation rates measured by the accelerometers due to their location away from the aircraft center of gravity, the following equation 8 is obtained for the gust component in the vertical axis.

$$F_{zgust} = m \cdot ((-a_{zsensor} - (R_B \cdot P_B - Q_B) \cdot (X_{cg})$$
$$-(Q_B \cdot R_B - P_B) \cdot (Y_{cg}) - (P_B^2 - Q_B^2) \cdot (Z_{cg})) - FZ_{body}$$
(Equation 8)

Referring once again to FIGS. 3 and 4, the body axis forces are composed of the lift 106, drag 108, sideforce 110, weight 112, and thrust vectors 114 that are taken to act at the vehicles center of gravity. The changes in body axis forces are primarily due to variations in engine thrust and control surface deflections. An estimate of both the thrust magnitude and direction 116 would have to be made for that flight condition. Difficulties arise in determining the thrust components due to inexact knowledge of the flow direction of the exhaust gases exiting the nozzle. Small errors in the estimate of the thrust vector lead to errors in the vertical and side forces due to thrust. The forces due to control surface deflection depend on knowledge of the pressure distribution over the surface 118. This pressure distribution depends on the aircraft's attitude in space, the surface deflection angle, and on the dynamic pressure (q) at that flight condition. Attitude information can be obtained by direct measurement from the INS platform or from information provided from the rate gyros 91 by integrating that are derived from $P_B$ 120, $Q_B$ 122 and $R_B$ 124. Problems arise in obtaining a value for q, which is normally obtained from atmospheric measurements. Estimates for the values for lift 106, drag 108, and sideforce 110 would need to be obtained from the relationships as shown in equation 9:

$$\text{Lift} = m \cdot (a_{zcg}) - w_B \cdot \cos(\theta) \cdot \cos(\phi) + F_{zthrust}$$
$$\text{Dag} = m \cdot (a_{xcg}) - w_B \cdot \sin(\theta) + F_{xthrust}$$
$$\text{Sideforce} = m \cdot (a_{ycg}) - w_B \cdot \cos(\theta) \cdot \sin(\phi) + F_{ythrust}$$
(Equation 9)

Difficulties can arise in obtaining an accurate estimate of sideslip angle using measurements of side acceleration on aircraft with a small $C_{Y\beta}$. A very large gain would need to be used on the side acceleration measurement. Using such high gain values could lead to coupling with structural modes and other small magnitude aircraft dynamics. These effects would need to be accounted for in the design of the flight control system.

An estimate for q 132 then would be obtained by estimating the values for $C_L$ 126, $C_D$ 128, and $C_M$ 130 at that flight condition and using the relationships in equation 10:

$$C_L = \frac{L}{q \cdot s}$$
$$C_D = \frac{D}{q \cdot s}$$
$$C_M = \frac{M}{q \cdot s \cdot c}$$
(Equation 10)

After this information is obtained the gust velocities can be derived by integration of the estimated forces due to turbulence in equation 11.

$$u_{\hat{G}} = \int_{T_1}^{T_2} \frac{F_{xgust}}{m} dt + C_1$$
$$v_{\hat{G}} = \int_{T_1}^{T_2} \frac{F_{ygust}}{m} dt + C_2$$
$$w_{\hat{G}} = \int_{T_1}^{T_2} \frac{F_{zgust}}{m} dt + C_3$$
(Equation 11)

Summing the body axis and gust velocities, an estimate for the total aircraft velocity can be obtained in equation 12.

$$u_{B\hat{G}} = u_B + u_{\hat{G}}$$
$$v_{B\hat{G}} = v_B + v_{\hat{G}}$$
$$w_{B\hat{G}} = w_B + w_{\hat{G}}$$
(Equation 12)

Finally, $\alpha$ 20 and $\beta$ 22 are calculated from the following relations.

$$\hat{\alpha} = \tan^{-1} \frac{w_{B\hat{G}}}{u_{B\hat{G}}}$$
$$\hat{\beta} = \sin^{-1} \frac{v_{B\hat{G}}}{\|Vt\|}$$
(Equation 13)

While other possible algorithms can be used to derive $\alpha$ and $\beta$, the principle behind these derivations remain the same. It is seen that this procedure depends on the use of estimated values. Problems can arise in obtaining accurate estimates of the thrust vector and of the dynamic pressure. Additionally, aeroelastic effects have not been included in these calculations. The method of the present invention could best be examined for use in a possible back-up device to probes or vanes, or as sources for correction curves, such as correcting angle-of-attack probes for the effect of sideslip angle.

Therefore, a method and system for exploiting the capabilities of inertial sensors used in an Inertial Navigation System (INS) to obtain analytic estimates of angle-of-attack ($\alpha$) and sideslip angle ($\beta$) has been shown. Additionally, using accelerometers to produce the estimated signals for $\alpha$ and $\beta$, can be combined with conventional probes to improve the frequency content of the probes using a complementary filter or a Kalman filter. For example, to remove the effect of linelags in a probe system, use the accelerometer based estimates for the frequency alpha and beta, and the probe measurements for the low frequency alpha and beta. These would be blended using a complimentary filter, with the high pass filter and the accelerometer based signal, and the low pass filter on the probe based signal. The estimate is also improved in other (perpendicular) axis by generating correction curves, for example correcting the angle-of-attack signal by removing sideslip angle effects.

Those skilled in the art will appreciate that various adoptions and modifications of the invention as described above can be configured without departing from the scope and spirit of the invention. It is therefore contemplated that such modifications can be made without departing from the spirit or scope of the present invention as defined in the appended claims.

What is claimed is:

1. An inertial navigation system, comprising:
   one or more angle of attack sensors for providing angle-of-attack data to a data processor and a lateral accelerometer for providing a lateral acceleration signal to said data processor for generaling an estimated sideslip angle, said data processor further analytically estimating wind and turbulence effects whereby said data processor delivers derived inertial value signals for providing control system feedbacks to a small unmanned aerospace vehicle, said vehicle having said sensors and accelerometer with said data processor whereby said data processor delivers inertial values for completely replacing conventional air data probes for providing control system feedbacks to said vehicle.

2. The inertial navigation system of claim 1, further comprising:

said vehicle having micro-electromechanical system sensors for providing angle-of-attack and sideslip data to said data processor for completely replacing conventional air data probes whereby said data processor delivers derived inertial value signals for providing control system feedbacks to said vehicle.

3. The inertial navigation system of claim 1, further comprising:

a dual axis accelerometer providing a normal acceleration signal to said data processor for estimating an angle-of-attack in the event of a single sensor failure.

4. The inertial navigation system of claim 3, further comprising:

a cockpit indicator for continuously indicating angle-of-attack indication and an approach indicator for providing fast/slow airspeed information from said data processor.

5. The inertial navigation system of claim 4, further comprising:

an angle-of-attack tone generator for providing an aural stall warning signal output to a pilot from said data processor.

6. The inertial navigation system of claim 5, further comprising:

a programmable aircraft configuration connector for providing said data processor aircraft nose mission configuration imputs and secondary flight control surface positions processed as a series of analog and discrete inputs into said data processor for further determining inertial values for providing control system feedbacks to said aircraft.

7. The inertial navigation system according to claim 1, further comprising:

conventional air data probes used in association with said data processors derived inertial value signals wherein said data processors signals used as a dissimilar backup to said probes and as a part of fault detection to select a bad probe and vote it out.

8. The inertial navigation system of claim 1, further comprising: conventional air data probes used in association with said data processor's derived inertial value signals wherein said conventional air data probes improve quality of air data measurements through a complementary filter wherein said data processors derived initial value signals used as estimates for high frequency angle-of-attack and sideslip angle and conventional air data probe measurements for low frequency angle-of-attack and sideslip both blended using a complimentary filter having high and low filters.

9. A method for estimating and correcting angle-of-attack and sideslip angle from acceleration measurements, said method comprising the steps of:

providing angle-of-attack data from one or more angle-of-attack sensors to a data processor;

providing a lateral acceleration signal to said data processor from a lateral accelerometer for generating an estimated sideslip angle, analytically estimating wind and turbulence effects by said data processor whereby said data processor delivers derived inertial value signals for providing control system feedbacks to a small unmanned aerospace vehicle, and completely replacing conventional air data probes for providing control system feedbacks to said vehicle by said data processors derived inertial value signals.

10. The method for estimating and correcting angle-of-attack and sideslip angle from acceleration measurements according to claim 9, further comprising the step of:

providing control system feedbacks to said vehicle having micro-electromechanical system sensors for angle-of-attack and sideslip data to a data processor for providing derived inertial value signals completely replacing conventional air data probes.

11. The method for estimating and correcting angle-of-attack and sideslip angle from acceleration measurements according to claim 9, further comprising the step of:

providing a normal acceleration signal to said data processors for estimating an angle-of-attack in the event of a single sensor failure by a probe or a vane or a dual axis accelerometer.

12. The method for estimating and correcting angle-of-attack and sideslip angle form acceleration measurements according to claim 9, further comprising the steps of:

continuously indicating angle-of-attack indication to a cockpit indicator and providing fast/slow airspeed information to an approach indicator.

13. The method for estimating and correcting angle-of-attack and sideslip angle from acceleration measurements according to claim 12, further comprising the steps of:

providing an aural stall warning signal output to a pilot from said data processor by an angle-of-attack tone generator.

14. The method of estimating and correcting angle-of-attack and sideslip angle from acceleration measurements according to claim 13, further comprising the steps of:

providing aircraft nose/mission configuration inputs to said data processor by a programmable aircraft configuration connector and processing as a series of analog and discrete inputs for secondary flight control surface positions into said data processor for further determining inertial values for providing control system feedbacks to said aircraft.

15. The method for estimating and correcting angle-of-attack and sideslip angle form acceleration measurements according to claim 9, further comprising the steps of:

utilizing conventional air data probes in association with said data processor's derived inertial value signals wherein said data processor's signals used as a dissimilar backup to said probes and as part of fault detection to select a bad probe and vote it out.

16. The method for estimating and correcting angle-of-attack and sideslip angle from acceleration measurements according to claim 9, further comprising the steps of:

utilizing conventional air data probes in association with said data processor's derived inertial value signals wherein said conventional air data probes improve quality of air data measurements through a complementary filter wherein said data processor's derived inertial value signals used as estimates for high frequency angle-of-attack and sideslip angle and conventional air data probe measurements for low frequency angle-of-attack and sideslip angle both blended using a complimentary filter having high and low pass filters.

17. The method for estimating and correcting angle-of-attack and sideslip angle from acceleration measurements according to claim 9, further comprising the steps of:

plotting curves from flight test data which correlate to said data processor derived inertial value signal, and utilizing said data processor derived inertial value signal for choosing a correct curve fit to produce an aircraft's angle-of-attack.

18. An inertial navigation system comprising:

one or more angle-of-attack sensors for providing angle-of-attack data to a data processor and a lateral accelerometer for providing a lateral acceleration signal to said data processor for generating an estimated sideslip angle, said data processor further analytically estimating wind and turbulence effects and plotting curves from flight test data for correlating data processor's derived inertial value signals and;

utilizing said data processor's derived inertial value signals for choosing a correct curve fit to produce a small unmanned aerospace vehicle's angle-of-attack value signals for providing control system feedbacks to said vehicle.

* * * * *